United States Patent
Liu et al.

(10) Patent No.: US 12,278,716 B2
(45) Date of Patent: Apr. 15, 2025

(54) SRS CARRIER SWITCHING FOR ADDITIONAL SRS

(71) Applicant: QUALCOMM Incorporated, San Diego, CA (US)

(72) Inventors: Le Liu, Fremont, CA (US); Alberto Rico Alvarino, San Diego, CA (US); Rebecca Wen-Ling Yuan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/320,217

(22) Filed: May 13, 2021

(65) Prior Publication Data

US 2021/0359882 A1 Nov. 18, 2021

Related U.S. Application Data

(60) Provisional application No. 63/025,146, filed on May 14, 2020.

(51) Int. Cl.
  *H04L 25/02* (2006.01)
  *H04L 5/00* (2006.01)
  (Continued)

(52) U.S. Cl.
  CPC ........ *H04L 25/0226* (2013.01); *H04L 5/0051* (2013.01); *H04W 8/24* (2013.01); *H04W 72/0453* (2013.01); *H04W 72/21* (2023.01)

(58) Field of Classification Search
  None
  See application file for complete search history.

(56) References Cited

U.S. PATENT DOCUMENTS 10,270,570 B2 * 4/2019 Liu ................... H04L 5/0078
10,333,670 B2   6/2019 Rico Alvarino et al.
(Continued)

FOREIGN PATENT DOCUMENTS

CN   103168441 A      6/2013
JP   2019514268 A  *  5/2019
(Continued)

OTHER PUBLICATIONS

International Search Report and Written Opinion—PCT/US2021/032634—ISA/EPO—Sep. 13, 2021.

*Primary Examiner* — Andrew C Oh
(74) *Attorney, Agent, or Firm* — Procopio, Cory, Hargreaves & Savitch LLP

(57) ABSTRACT

Methods, apparatuses, and computer-readable medium for SRS are provided. An example UE may receive an SRS configuration and a downlink transmission scheduling an uplink transmission, the uplink transmission being scheduled on a CC, the SRS configuration comprising one or more additional SRS symbols relative to a first set of SRS symbols associated with an aperiodic trigger Type 1 or a periodic trigger Type 0, the one or more additional SRS symbols being scheduled on a destination CC at least one of the one or more additional SRS symbols overlapping at least partially with the uplink transmission. The example UE may drop or delay transmission of at least a part of an SRS in the one or more additional SRS symbols on the destination CC or at least a part of the uplink transmission on the source CC.

30 Claims, 19 Drawing Sheets

(51) Int. Cl.
*H04W 8/24* (2009.01)
*H04W 72/0453* (2023.01)
*H04W 72/21* (2023.01)

(56) References Cited

U.S. PATENT DOCUMENTS

| | | | |
|---|---|---|---|
| 2010/0135273 A1* | 6/2010 | Kim | H04L 5/0053 370/344 |
| 2012/0069812 A1* | 3/2012 | Noh | H04L 5/0048 370/329 |
| 2012/0113946 A1* | 5/2012 | Seo | H04L 5/0094 370/329 |
| 2012/0263129 A1 | 10/2012 | Noh et al. | |
| 2013/0250847 A1* | 9/2013 | Lee | H04L 5/0007 370/315 |
| 2014/0119302 A1* | 5/2014 | Ahn | H04L 5/0094 370/329 |
| 2014/0321392 A1* | 10/2014 | Li | H04W 52/34 370/329 |
| 2015/0031409 A1* | 1/2015 | Ahn | H04W 52/34 455/522 |
| 2015/0296490 A1* | 10/2015 | Yi | H04L 1/1812 370/329 |
| 2015/0304994 A1* | 10/2015 | Kim | H04L 27/2601 370/280 |
| 2016/0316440 A1* | 10/2016 | Dinan | H04W 72/0473 |
| 2017/0027013 A1* | 1/2017 | Kim | H04W 52/383 |
| 2017/0303215 A1* | 10/2017 | Kim | H04W 52/48 |
| 2018/0007707 A1 | 1/2018 | Rico Alvarino et al. | |
| 2018/0020335 A1* | 1/2018 | Yin | H04W 28/0268 |
| 2019/0075524 A1* | 3/2019 | Zhou | H04L 5/0098 |
| 2019/0109688 A1* | 4/2019 | Kim | H04L 5/0048 |
| 2019/0200359 A1* | 6/2019 | Choi | H04W 72/21 |
| 2019/0207731 A1* | 7/2019 | Park | H04B 7/0456 |
| 2019/0229859 A1 | 7/2019 | Manolakos et al. | |
| 2019/0379560 A1* | 12/2019 | Choi | H04L 5/0051 |
| 2020/0106646 A1* | 4/2020 | Liu | H04L 1/0013 |
| 2020/0162214 A1* | 5/2020 | Tang | H04L 5/0051 |
| 2020/0169958 A1* | 5/2020 | Lee | H04W 52/146 |
| 2020/0221311 A1* | 7/2020 | Liu | H04L 5/0087 |
| 2020/0228268 A1* | 7/2020 | Cao | H04B 7/0626 |
| 2020/0295894 A1* | 9/2020 | Kang | H04L 5/0026 |
| 2020/0336998 A1* | 10/2020 | Rahman | H04B 7/0639 |
| 2021/0344527 A1* | 11/2021 | Go | H04W 72/23 |
| 2021/0410162 A1* | 12/2021 | Kang | H04W 72/1263 |
| 2022/0116178 A1* | 4/2022 | Go | H04L 1/0013 |
| 2022/0150832 A1* | 5/2022 | Yang | H04W 72/535 |
| 2022/0174700 A1* | 6/2022 | Go | H04L 27/26025 |
| 2022/0200768 A1* | 6/2022 | Go | H04W 72/23 |
| 2022/0201721 A1* | 6/2022 | Yang | H04W 74/0833 |
| 2022/0264603 A1* | 8/2022 | Yang | H04W 72/23 |
| 2022/0369244 A1* | 11/2022 | Liu | H04W 52/365 |
| 2022/0394622 A1* | 12/2022 | Matsumura | H04W 52/0274 |

FOREIGN PATENT DOCUMENTS

| | | | | |
|---|---|---|---|---|
| WO | WO-2014027852 A1 * | 2/2014 | | H04W 24/10 |
| WO | 2017192232 A1 | 11/2017 | | |
| WO | 2018005481 A1 | 1/2018 | | |
| WO | WO-2020084362 A1 * | 4/2020 | | H04L 27/2613 |

\* cited by examiner

SRS CARRIER SWITCHING FOR ADDITIONAL SRS

CROSS REFERENCE TO RELATED APPLICATION(S)

This application claims the benefit of and priority to U.S. Provisional Application Ser. No. 63/025,146, entitled "SRS CARRIER SWITCHING FOR ADDITIONAL SRS" and filed on May 14, 2020, which is expressly incorporated by reference herein in its entirety.

BACKGROUND

Technical Field

The present disclosure relates generally to wireless communication, and more particularly, to scheduling of sounding reference signals (SRS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). There exists a need for further improvements in 5G NR technology.

Wireless communication devices including base stations and user equipment (UE) may transmit various synchronization signals and reference signals. For example, a UE may transmit a sounding reference signal (SRS) on the uplink to a base station. The SRS may be used for estimating transmission quality of a transmission channel. For example, the base station may use the SRS to obtain channel state information (CSI) for a UE. A base station may configure multiple resources for the SRS including one or more symbols. In some scenarios, SRS symbols transmitted in an uplink subframe may collide (for example, due to overlap in time) with another uplink subframe for another transmission, such as a physical uplink shared channel (PUSCH) transmission. Such collisions may cause SRS symbols in the SRS to be dropped, affecting the base station's ability to obtain CSI, which in turn may potentially affect the overall data rate of the wireless communication. Such collisions may also cause errors or negatively impact the other uplink transmission, such as the PUSCH transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication. The method includes receiving a user equipment (UE) capability for sounding reference signal (SRS) switching from a source component carrier (CC) to a destination CC for an aperiodic SRS on additional SRS symbols (such as one or more Type 2 SRS symbols) relative to a first set of SRS symbols. The method further includes transmitting scheduling that schedules the UE to avoid transmitting an uplink transmission on the source CC during a duration of time that includes a retuning time for the SRS switching and a transmission time for transmitting the additional SRS symbols of the aperiodic SRS on the destination CC.

Another innovative aspect of the subject matter described in this disclosure can be implemented in a method for wireless communication. The method includes transmitting an indication of a UE capability to a base station for SRS switching from a source CC to a destination CC to transmit an aperiodic SRS on additional SRS symbols relative to a first set of SRS symbols. The method further includes receiving, based on the UE capability, scheduling for communication with the base station that avoids transmitting an uplink transmission on the source CC during a duration of time that includes a retuning time for the SRS switching and a transmission time for transmitting the additional SRS symbols of the aperiodic SRS on the destination CC.

In some implementation, the method further includes transmitting the uplink transmission on the source CC prior to or after transmitting the additional SRS symbols.

Another innovative aspect of the subject matter described in this disclosure can be implemented in a method for wireless communication. The method includes receiving an SRS configuration and a downlink transmission scheduling an uplink transmission, the uplink transmission being scheduled on a component carrier (CC), the SRS configuration comprising one or more additional SRS symbols relative to a first set of SRS symbols associated with an aperiodic trigger Type 1 or a periodic trigger Type 0, the one or more additional SRS symbols being scheduled on a destination CC at least one of the one or more additional SRS symbols overlapping at least partially with the uplink transmission. The method further includes dropping or delaying at least a part of an SRS in the one or more additional SRS symbols on the destination CC or at least a part of the uplink transmission on the source CC.

In some implementation, the method further includes using a priority rule to determine whether to drop at least the part of the aperiodic SRS in the additional SRS symbols on the destination CC or at least the part of the uplink transmission on the source CC.

Another innovative aspect of the subject matter described in this disclosure can be implemented in a method for wireless communication. The method includes receiving a UE capability for SRS switching from a source CC to a destination CC for an aperiodic SRS on additional SRS symbols relative to a first set of SRS symbols. The method further includes transmitting scheduling that schedules the UE to avoid transmitting a downlink transmission on the source CC during a duration of time that includes a retuning time for the SRS switching and a transmission time for transmitting the additional SRS symbols of the aperiodic SRS on the destination CC.

Another innovative aspect of the subject matter described in this disclosure can be implemented in a method for wireless communication. The method includes receiving scheduling for a downlink transmission on a source CC. The method further includes receiving scheduling for an aperiodic SRS on additional SRS symbols relative to a first set of SRS symbols with SRS switching from the source CC to a destination CC. The method further includes determining an overlap in time between a transmission time of the downlink transmission on the source CC and a duration of time that includes a transmission time of the additional SRS symbols of the aperiodic SRS on the destination CC and a retuning time for SRS switching. The UE may not monitor the downlink transmission in a subframe including the overlap in time.

In some implementations, the downlink transmission includes a physical downlink shared channel (PDSCH) or a physical downlink control channel (PDCCH).

Another innovative aspect of the subject matter described in this disclosure can be implemented in a method for wireless communication. The method includes receiving a UE capability for SRS switching and a retuning time from a source CC to a destination CC for an aperiodic SRS on additional SRS symbols relative to a first set of SRS symbols with carrier switching. The method further includes scheduling communication with a UE, including the aperiodic SRS on the additional SRS symbols based on the UE capability.

Another innovative aspect of the subject matter described in this disclosure can be implemented in a method for wireless communication. The method includes transmitting an indication of support for a carrier switching capability for transmitting an aperiodic SRS on one or more additional SRS symbols relative to a first set of SRS symbols associated with an aperiodic trigger Type 1 or a periodic trigger Type 0, the one or more additional SRS symbols being associated with SRS switching from a source CC to a destination CC and being on the destination CC. The method further includes receiving scheduling for communication with a base station, including the aperiodic SRS on the one or more additional SRS symbols based on the carrier switching capability.

In some implementations, the method further includes receiving an additional UE capability for the aperiodic SRS on the additional SRS symbols without the carrier switching.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
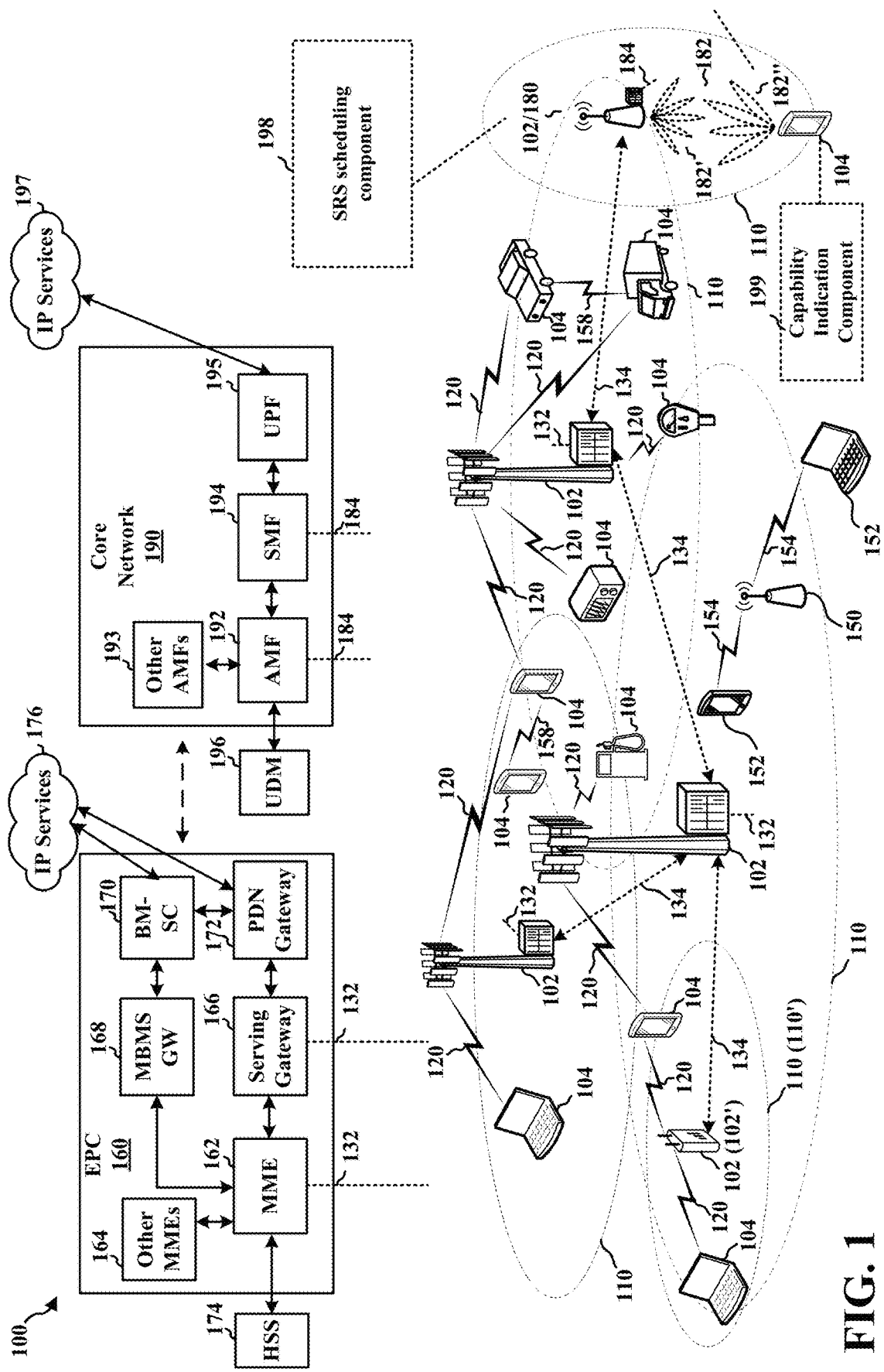
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In various wireless communication networks, such as time division duplex (TDD) multiple input multiple output (MIMO) networks, sounding reference signals (SRS) may be used for reciprocity-based beamforming. For example, a user equipment (UE) may transmit an SRS on the uplink and a base station may estimate the channel and perform beamforming or precoding on the downlink based on the estimated channel. Some UEs may support more downlink component carriers (CCs) than uplink CCs. Some UEs may be configured with a TDD secondary cell (SCell) with downlink carrier aggregation (CA) but no uplink CA. To enable aperiodic SRS transmission on a TDD CC for such UEs, additional SRS relative to a first set of SRS symbols may be supported because the first set of SRS symbols may not support such aperiodic SRS transmission. The additional SRS may correspond with SRS trigger type 2 and the first set of SRS symbols may correspond with SRS trigger type 0 and trigger type 1.

For a physical uplink shared channel (PUSCH)-less SCell (SCell without PUSCH), the UE may be configured with one or more SRS (hereinafter also referred to as "additional SRS") in addition to the first set of SRS. A PUSCH-less SCell may refer to a cell that is not configured for PUSCH transmissions from the UE. The first set of SRS may include a Type 0 periodic (in other words, SRS with trigger Type 0) and a Type 1 aperiodic SRS (in other words, SRS with trigger Type 1) (which may both be transmitted as a last symbol in a normal UL subframe, PUSCH), and the additional SRS may be a Type 2 SRS (in other words, SRS with trigger Type 2). The additional SRS may be of a different size, for example, between seven and twelve symbols longer than the first set of SRS. A Type 1 aperiodic SRS may be a non-periodic SRS configured by radio resource control (RRC) signaling and triggered by downlink control information (DCI). A UE may also receive RRC signaling configuring a Type 0 periodic SRS that is transmitted in a periodic manner.

A UE may support SRS carrier switching to enable periodic or aperiodic SRS transmission in a PUSCH-less TDD SCell. When enabled, SRS carrier switching involves the UE interrupting a transmission in a first uplink CC (which could be a frequency division duplex (FDD) CC) and retuning to a PUSCH-less TDD SCell on a second uplink CC. The UE may transmit the SRS in the TDD SCell and then retune back to the first UL CC. A UE may report a switching capability (which may include a switching time) for SRS carrier switching. For example, the UE may report the capability to switch from band A (source CC) to band B (destination CC). Additionally or alternatively, the UE may report the switching time in terms of orthogonal frequency-division multiplexing (OFDM) symbols. A base station may configure the serving cell so that the UE may interrupt to transmit the SRS in the SCell.

For SRS carrier switching, dropping rules may be defined for a UE or a base station to address collisions (in which two or more signals or data packets overlap in time) related to carrier switching, in other words, collisions that may occur due to a UE's SRS switching (that may include the additional SRS) from the destination CC to the source CC with a transmission in the source CC. The dropping rule may be applied by 1) the base station while scheduling for the UE or 2) by the UE in transmitting SRS transmissions and uplink data transmissions. A collision may occur between the SRS transmissions and the uplink data transmissions. A base station or a UE may reduce the probability of collisions based on downlink and uplink transmission collision rules. As used herein, the term "SRS with carrier switching" may refer to an SRS transmitted by a UE that switches carriers in order to transmit the SRS. An example uplink transmission collision rule may define that hybrid automatic repeat request (HARD) transmissions, scheduling requests (SRs), rank indicators (RIs), precoder type indicators (PTIs), and channel state information reference signal (CSI-RS) resource indicators (CRIs) take priority over aperiodic SRS in the additional SRS with carrier switching, which may take priority over aperiodic CSI, which may take priority over periodic SRS in the first set of SRS associated with a switching from a source CC to a destination CC, which may take priority over other CSI, which may in turn take priority over SRS without carrier switching. An example downlink transmission collision rule may define that if the UE is not capable of simultaneous reception/transmission in multiple CCs, the UE may not monitor for a physical downlink control channel (PDCCH) or a physical downlink shared channel (PDSCH) in subframes impacted by SRS carrier switching. Additionally, the UE may not be configured with carrier switching that may interrupt downlink reception in various subframes, which may cause collision between a downlink reception and a SRS transmission and loss of data. However, there may be a need to address collisions related to the additional SRS relative to the first set of SRS because the additional SRS may include more symbols than the first set of SRS and may be subject to collision issues that are not addressed by the example collision rules above.

Various aspects relate generally to the scheduling of SRS for a UE that may perform carrier switching. Some implementations more specifically relate to the scheduling of additional SRS with carrier switching to avoid a collision between the additional SRS and another uplink or downlink transmission, such as a PUSCH, PDSCH, or PDCCH. A UE may transmit a UE capability to a base station indicating a capability of the UE for SRS switching from a source CC to a destination CC for an aperiodic SRS on additional SRS symbols. The symbols may be referred to as "additional SRS symbols" relative to a first, smaller set of SRS symbols, as previously discussed. The base station may schedule the UE to avoid a collision between the additional SRS symbols and a previous uplink/downlink transmission or a next uplink/downlink transmission.

Particular implementations of the subject matter described in this disclosure can be implemented to realize one or more of the following potential advantages. In some implementations, the described techniques can be used to address collision issues related to the additional SRS symbols. By scheduling the UE to avoid the collision between the additional SRS symbols and a uplink transmission, the UE may transmit the additional SRS symbols and the uplink transmission such that the uplink transmission will not adversely impact the transmission of the additional SRS symbols.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations or uses may come about via integrated chip implementations and other non-module-component based devices (such as end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (such as hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz, or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, or FR5, or may be within the EHF band. A base station 102, whether a small cell 102' or a large cell (such as macro base station), may include or be referred to as an eNB, gNodeB (gNB), or another type of base station. Some base stations, such as gNB 180 may operate in a traditional sub 6 GHz spectrum, in millimeter wave frequencies, or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network or individually access the network.

Referring again to FIG. 1, in some aspects, the UE 104 may include a capability indication component 199 configured to indicate a UE capability to a base station 102 or 180 for SRS switching from a source CC to a destination CC to transmit an aperiodic SRS on additional SRS symbols relative to a first set of SRS symbols.

In some aspects, the base station 102 or 180 may include SRS scheduling component 198 configured to receive a UE capability from a UE 104, the UE capability being a capability for SRS switching from a source CC to a destination CC for an aperiodic SRS on additional SRS symbols relative to a first set of SRS symbols. The SRS scheduling component 198 is further configured to transmit, or cause a transmitter to transmit, scheduling that schedules the UE to avoid a collision between an uplink transmission on the source CC and the additional SRS symbols of the aperiodic SRS on the destination CC.

Although the following description may be focused on 5G NR, the concepts described herein may be applicable to other similar areas, such as LTE, LTE-A, CDMA, GSM, and other wireless technologies.

FIGS. 2A-2D illustrate a frame structure, and the aspects of the present disclosure may be applicable to other wireless communication technologies, which may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. For normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

Figure 2:
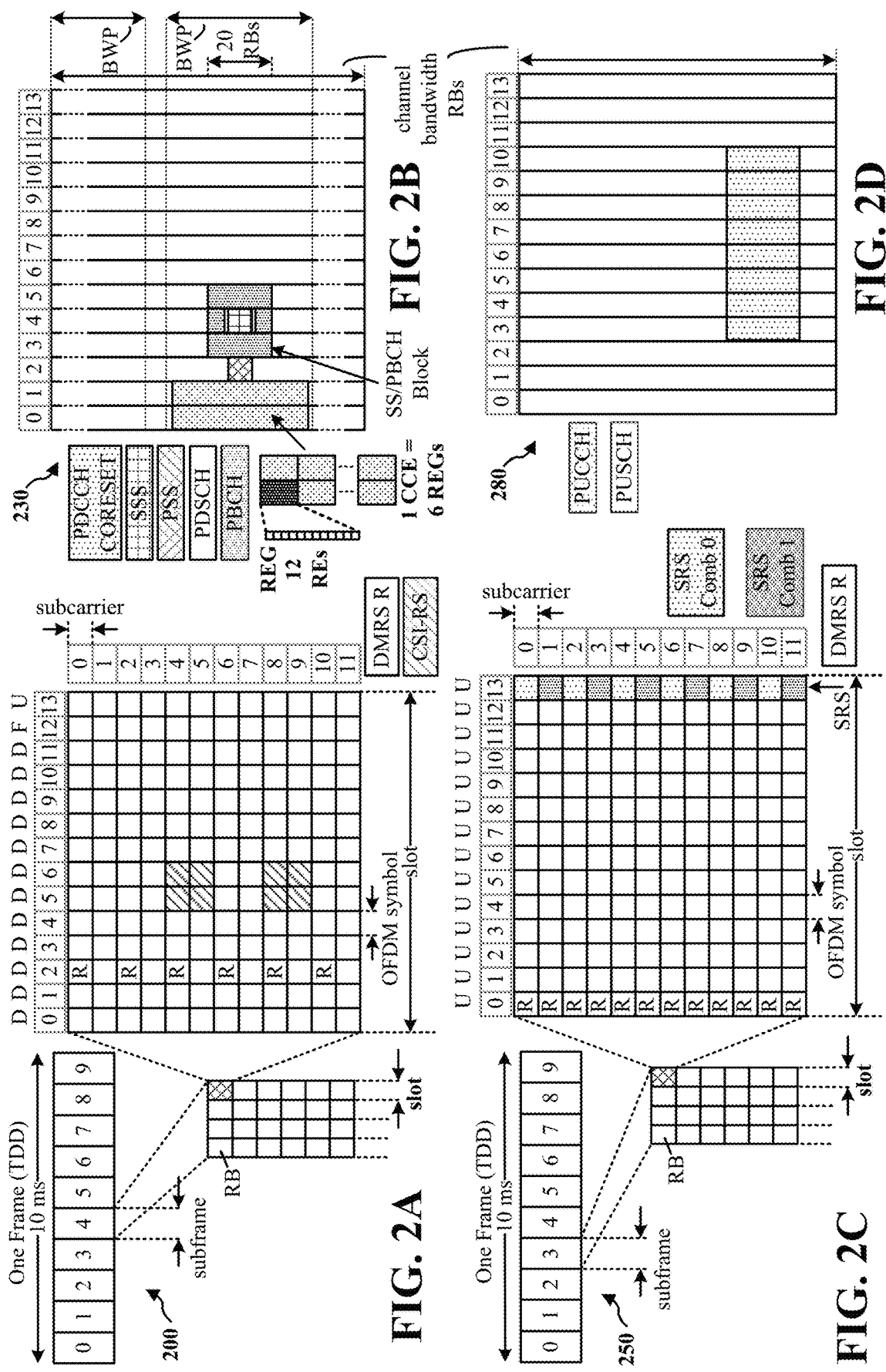
FIGS. 2A, 2B, 2C, and 2D are diagrams illustrating examples of a first 5G/NR frame, downlink (DL) channels within a 5G/NR subframe, a second 5G/NR frame, and UL channels within a 5G/NR subframe, respectively.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (such as 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (such as common search space, UE-specific search space) during PDCCH monitoring occasions on the CORESET, where the PDCCH candidates have different DCI formats and different aggregation levels. Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (in other words, one or more HARQ ACK bits indicating one or more ACK or negative ACK (NACK)). The PUSCH carries data, and may additionally be used to carry a buffer status report (BSR), a power headroom report (PHR), or UCI.

Figure 3:
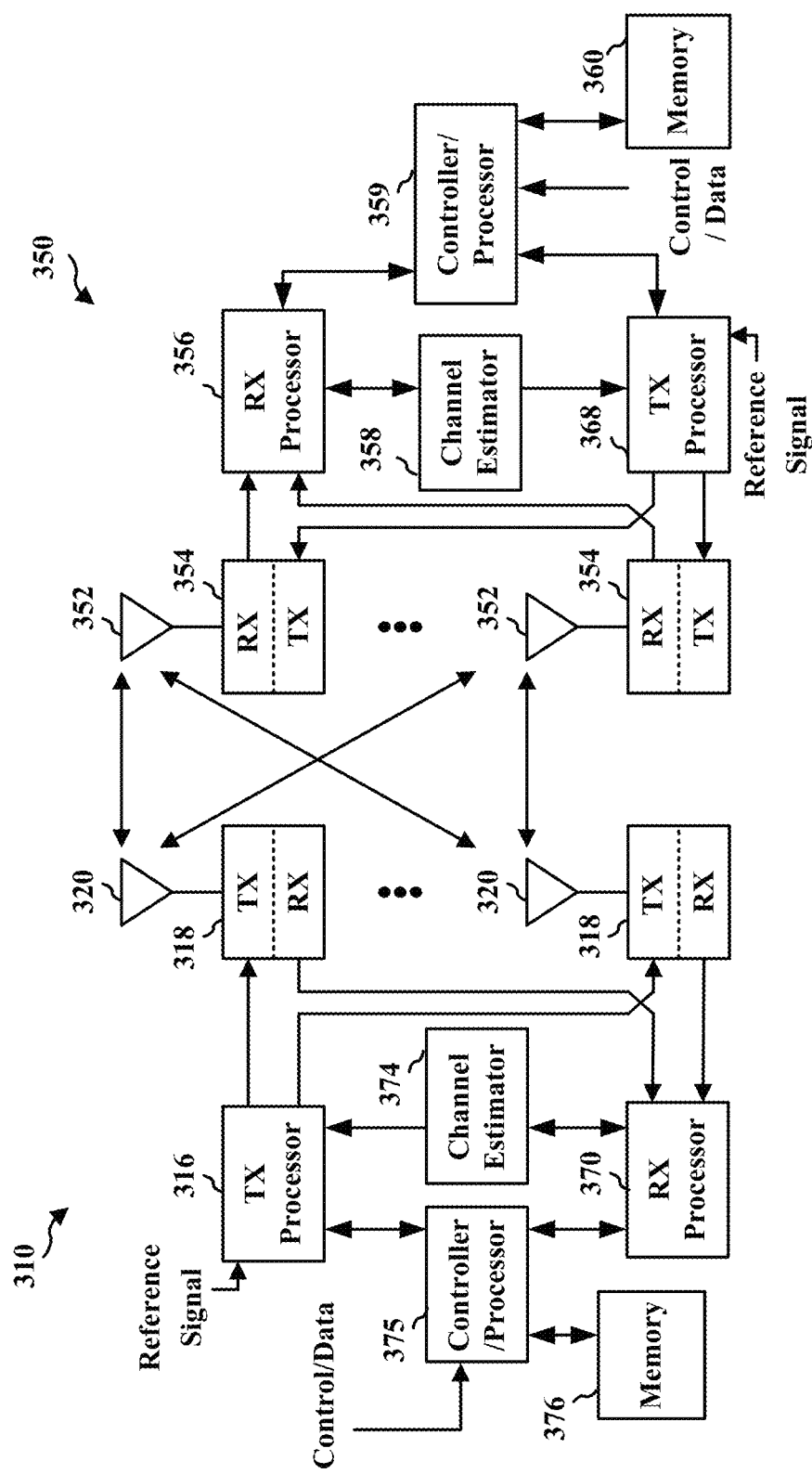
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with capability indication component 199 of FIG. 1. At least one of the TX processor 316, the RX processor 370, and the controller/processor 375 may be configured to perform aspects in connection with SRS scheduling component 198 of FIG. 1.

Figure 4:
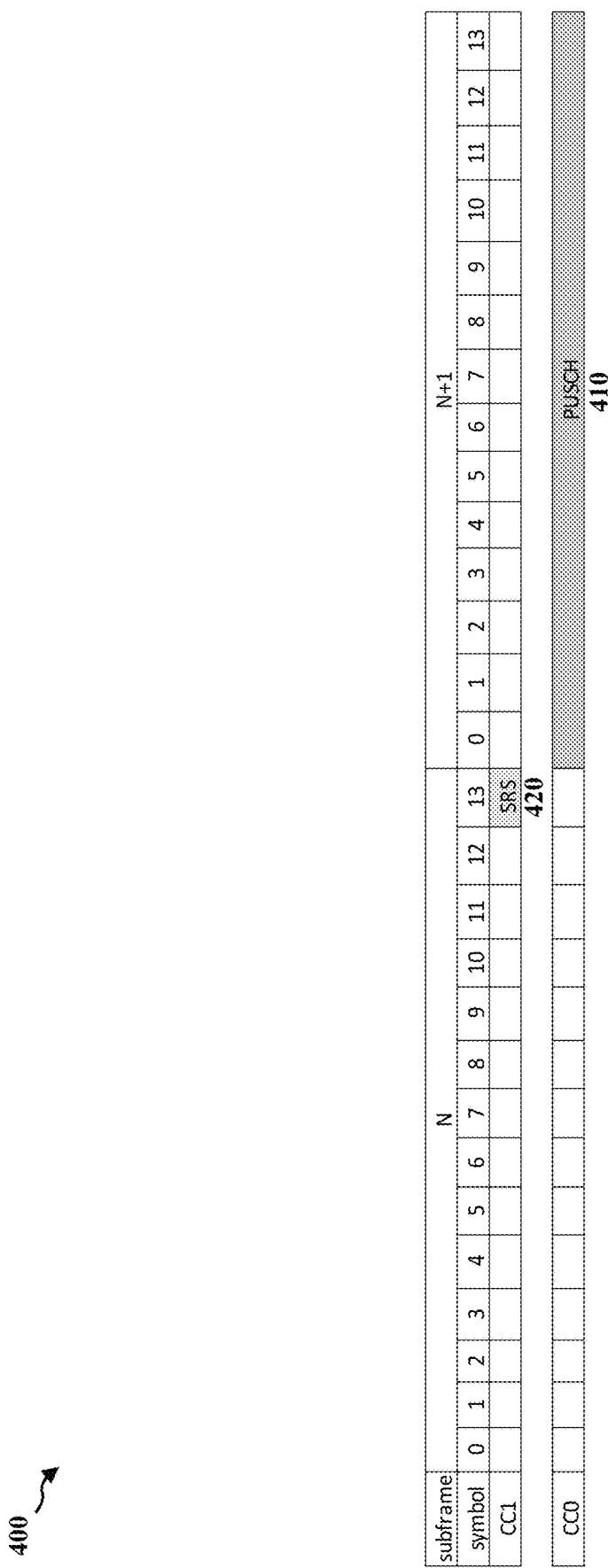
FIG. 4 shows a diagram illustrating an example collision of an uplink transmission.

FIG. 4 shows a diagram illustrating an example collision 400 of an uplink transmission. In the illustrated example, the PUSCH 410 at subframe N+1 collides with the SRS 420 transmitted at subframe N for a duration of one symbol. A first symbol of the PUSCH may be punctured if the PUSCH carrying data has lower priority than the SRS with carrier switching. The first symbol is used for retuning when the UE switches from the destination CC to transmit SRS back to source CC to transmit PUSCH.

Figure 5:
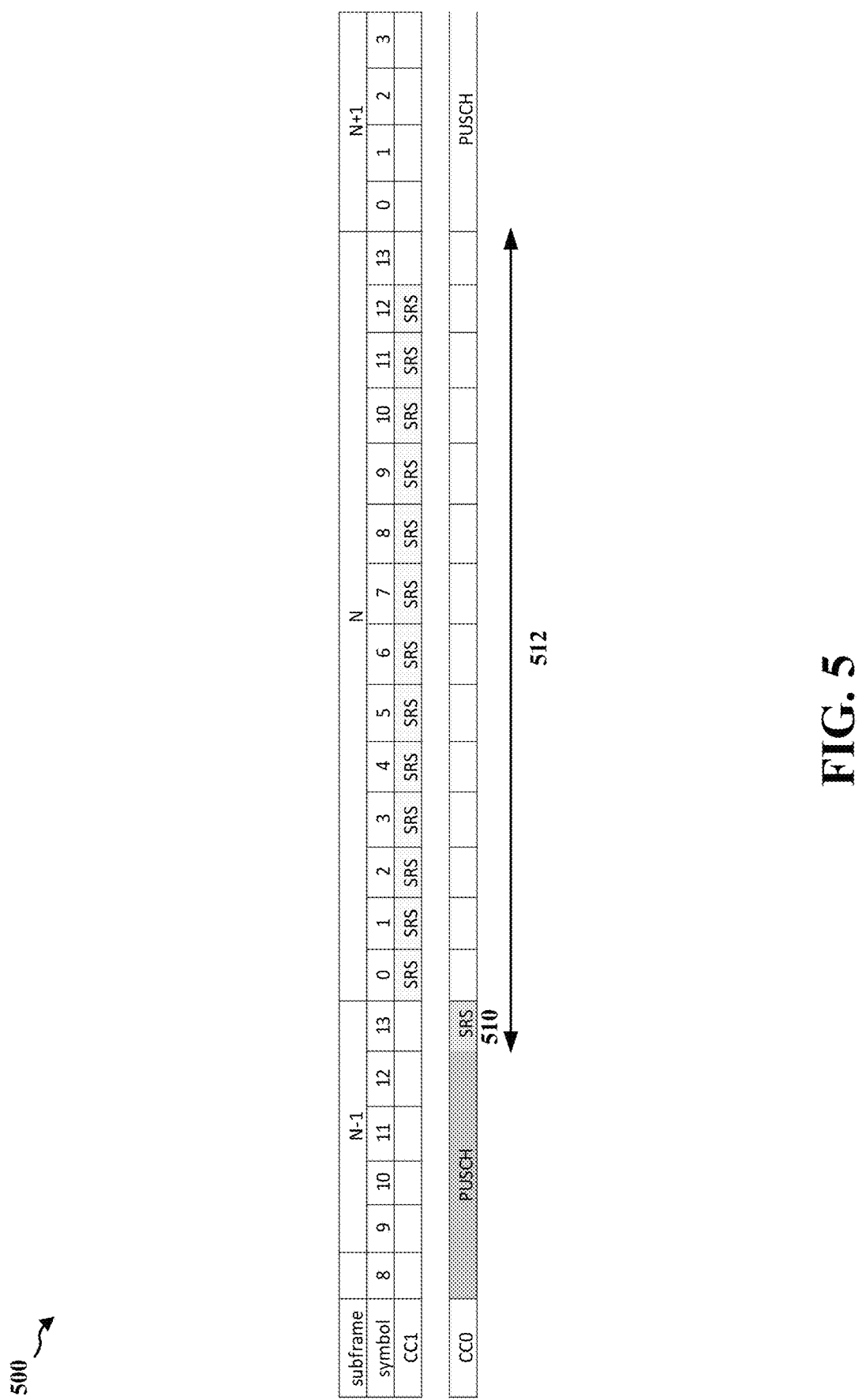
FIG. 5 shows a diagram illustrating an example collision of an uplink transmission with an additional sounding reference signal (SRS) relative to a first set of SRS.

FIG. 5 shows a diagram illustrating an example collision 500 of an uplink transmission with additional SRS symbols relative to the first set of SRS. As illustrated in FIG. 5, at subframe N−1, a first set of SRS may be transmitted within a first set of symbols at 510. At subframe N, the additional SRS may be transmitted within a second, larger set of symbols at 512. In the illustrated example, at 510, the additional SRS in subframe N of the destination CC, such as a SCell without a PUSCH or a PUCCH, collides with the PUSCH and the first set of SRS in last symbol at N−1 subframe of the source CC. The additional SRS in subframe N may also collide with the PUSCH at subframe N+1 of the source CC if the retuning time is more than one symbol. Such collision may cause errors or otherwise negatively affect the transmission of the PUSCH at subframe N+1/N−1 or the transmission of the additional SRS. Some implementations herein relate to scheduling of additional SRS to avoid such collisions between the additional SRS and the PUSCH transmissions. A collision refers to an overlap in time between the two transmissions.

Figure 6:
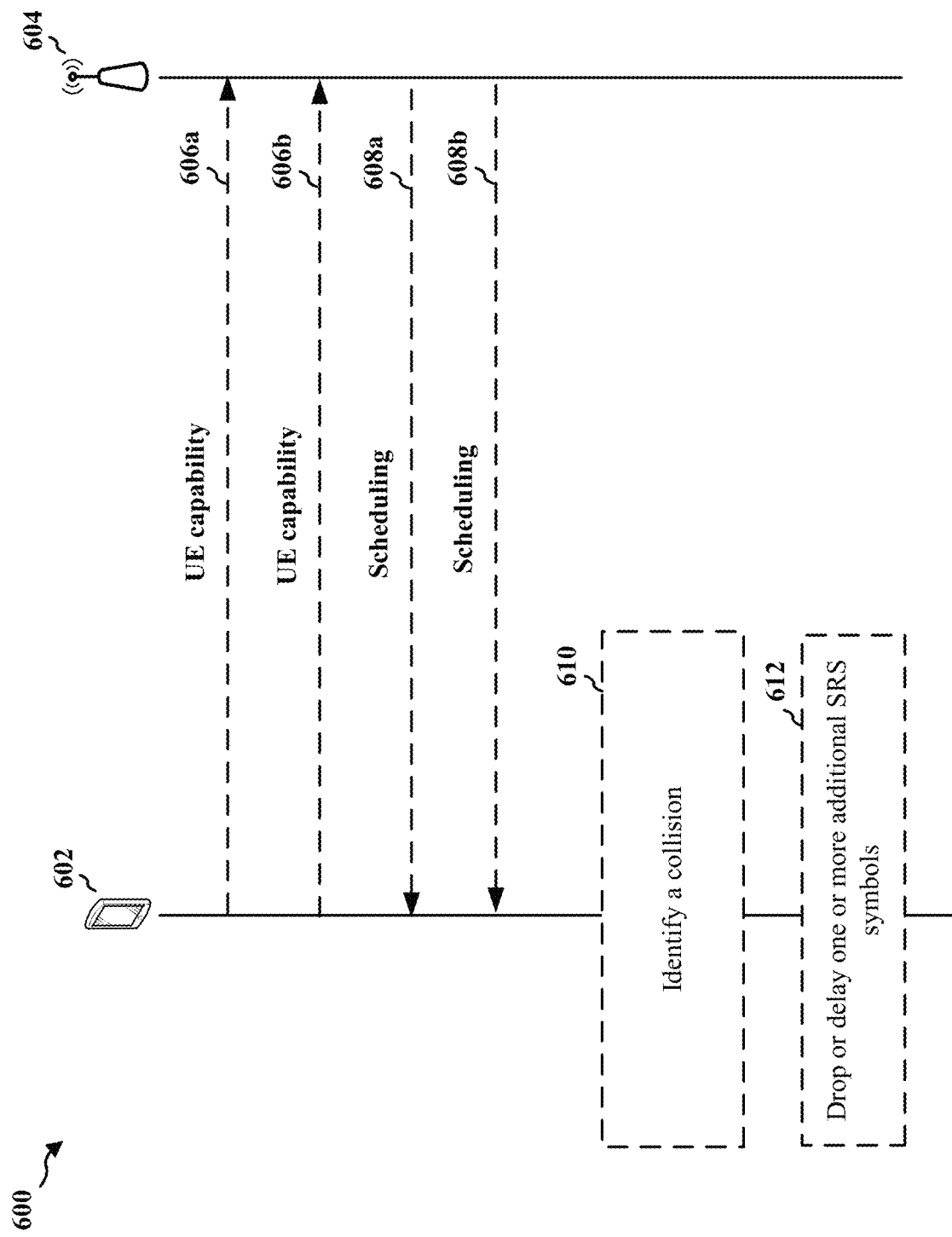
FIG. 6 shows an example communication flow between a base station and a UE that supports additional SRS scheduling in accordance with some aspects of the present disclosure.

FIG. 6 shows a communication flow 600 between a base station 604 and a UE 602 that supports the additional SRS scheduling in accordance with some aspects of the present disclosure. As illustrated in FIG. 6, the UE may transmit, at 606a, UE capability to base station 604. The UE capability may be a UE capability for SRS switching from a source CC to a destination CC for an aperiodic SRS (in other words, a non-periodic SRS that is triggered based on signaling from a base station) on additional SRS symbols relative to a first set of SRS symbols. In some aspects, the UE capability may further indicate a retuning time from the source CC to the destination CC for an aperiodic SRS on additional SRS symbols relative to a first set of SRS symbols.

In some aspects, the UE capability may be a first UE capability for an aperiodic SRS on additional SRS symbols without carrier switching. In some aspects, the UE 602 may be a license assisted access (LAA) capable UE and may transmit, at 606b, a second UE capability for aperiodic SRS on the additional SRS symbols with carrier switching. In such aspects, as part of 606b, the UE may indicate a retuning time from a source CC to a destination CC for an aperiodic SRS on the additional SRS symbols in an uplink subframe with the carrier switching. In some aspects, the second UE capability may indicate whether the UE supports the aperiodic SRS on the additional SRS symbols with the carrier switching for a band combination. It may be possible that the UE capability is dependent on the carrier/band type, for example, the UE may be not expected to be configured with aperiodic SRS on the additional SRS symbols with carrier switching on an unlicensed band or on a LAA SCell. In some aspects, the second UE capability may indicate whether the UE supports the aperiodic SRS on the additional SRS symbols with the carrier switching for a band pair of a band combination. In some aspects, the second UE capability may indicate whether the UE supports a general capability for the aperiodic SRS on the additional SRS symbols with the carrier switching. In some aspects, the UE may indicate the second UE capability without reference to a band combination.

At 608a, the base station 604 may transmit a message that includes scheduling for the SRS symbols to the UE 602. In some aspects, the scheduling schedules the UE 602 to avoid a collision between an uplink transmission on the source CC and the additional SRS symbols of the aperiodic SRS on the destination CC. In some aspects, the scheduling may indicate (in other words, include an indication for) the UE 602 to avoid collisions between additional SRS and a previous uplink channel (in other words, an uplink channel occurring prior to) and a next uplink channel (in other words, an uplink channel occurring after), such as a PUSCH.

Figure 7:
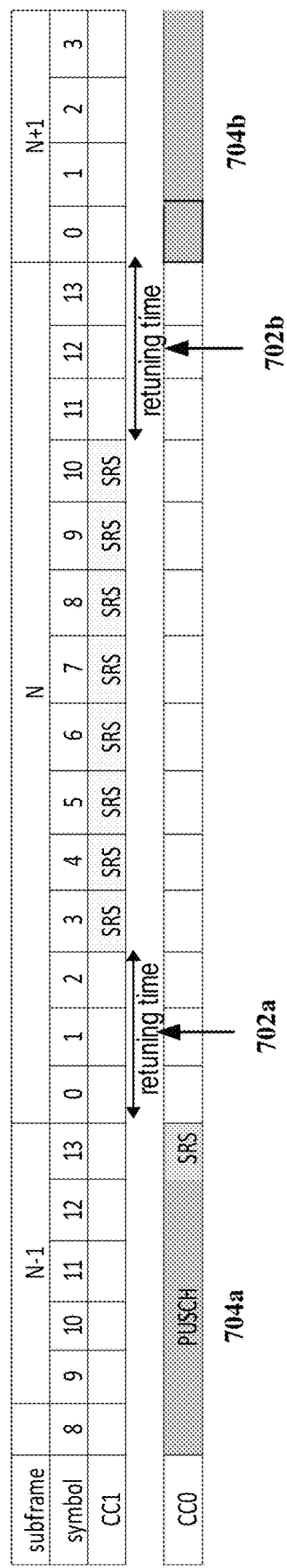
FIG. 7 shows a diagram illustrating example scheduling to avoid a collision between an additional SRS and a previous and a next uplink transmission in accordance with some aspects of the present disclosure.

In some aspects, the scheduling may take into account a retuning time. An additional SRS may be referred to as "overlapping with", "in collision with" or "colliding with" another uplink or downlink transmission if the additional SRS would be (in other words, scheduled to be) transmitted during a duration of time that includes the transmission time of the other transmission and the retuning time. FIG. 7 shows a diagram 700 illustrating example scheduling to avoid collision between the additional SRS on CC1 and a previous and a next uplink transmission on CC0. The SRS on CC1 may be referred to as an "additional" SRS because it may be scheduled on additional symbols beyond a smaller set of potential symbols that may be referred to as a first set or a normal set of SRS symbols. As illustrated in FIG. 7, the UE may use retuning time 702a and retuning time 702b to switch between the CCs to transmit the SRS on CC1. The retuning time 702a defines an amount of time for the UE to switch from CC0 to CC1 between a previous uplink transmission at subframe N−1, such as a PUSCH 704a, and the SRS transmission on CC1. The scheduling may indicate that the UE will not transmit the one or more additional SRS symbols until the previous uplink transmission has finished and after the retuning time 702a has passed. Similarly, the retuning time 702b defines an amount of time for the UE to switch back from CC1 to CC0 between the SRS transmission on CC1 and the next uplink transmission on CC0 at subframe N+1, such as a PUSCH 704b. The scheduling may indicate that the UE will not transmit the next uplink transmission until the transmission of the one or more additional SRS symbols has finished and after the retuning time 702b has passed.

In some aspects, the scheduling may avoid collisions between the additional SRS and a previous uplink channel. In such aspects, the scheduling may indicate that the UE is not expected to be scheduled with collision between the additional SRS and an uplink transmission in a previous subframe. In some aspects, the scheduling may limit the symbols for the additional SRS to be in a range of $\{N_{symb}^{retune}, (N_{symb}^{retune}+1), \ldots,$ number of total SRS symbols, such as 13$\}$. $N_{symb}^{retune}$ is a symbol number for retuning. In such aspects, the UE may be not expected to be triggered to transmit additional SRS on a CC without PUSCH or PUCCH without a PUSCH or a PUCCH in subframe N that overlaps (including the retuning time) with uplink transmission in subframe N−1 on a different CC. In such aspects, considering the impact of different timing advances on different CCs in addition to the retuning time, the UE may be not expected to be triggered to transmit additional SRS on a CC without PUSCH or PUCCH in subframe N that overlaps (including the retuning time) with uplink subframe N−1 on a different CC.

Figure 8:
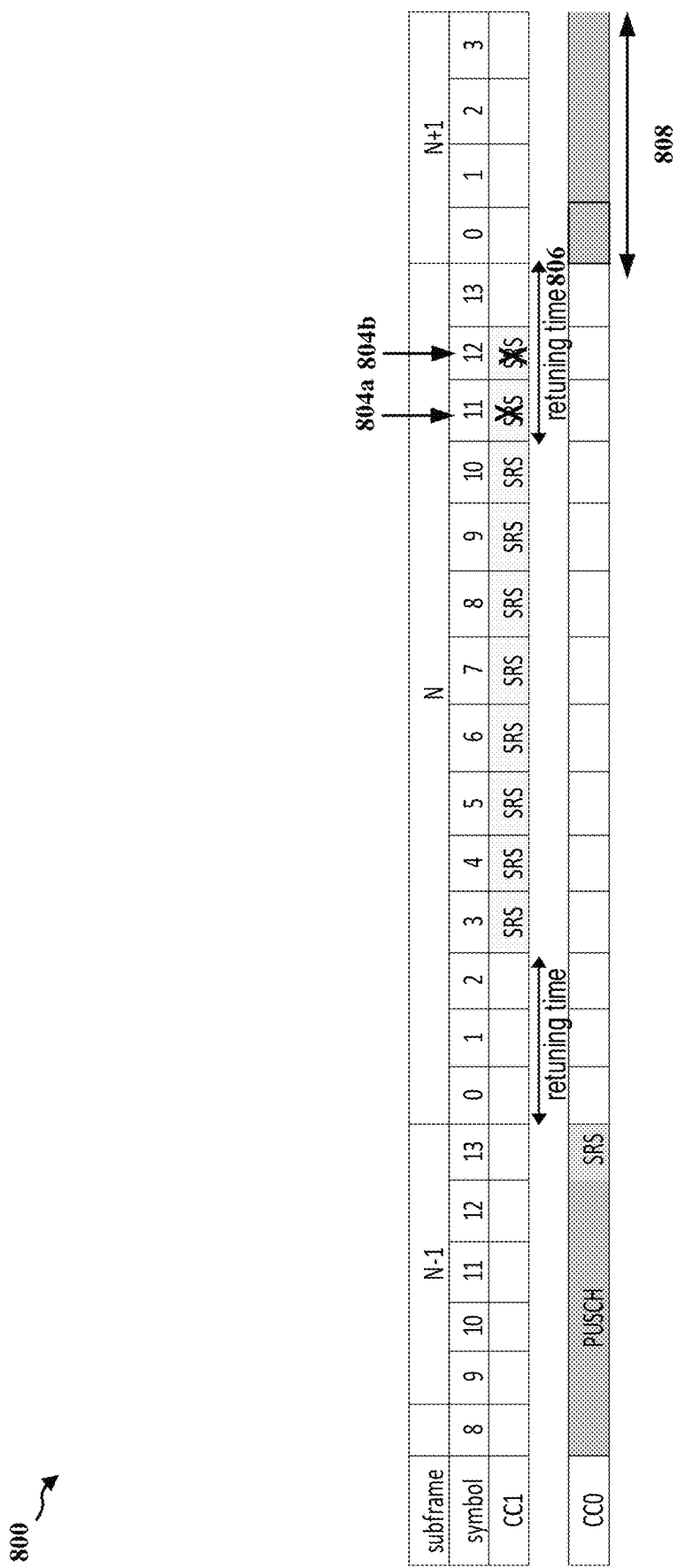
FIG. 8 shows a diagram illustrating example rules for addressing collisions between an additional SRS symbol and a next uplink transmission in accordance with some aspects of the present disclosure.

In some aspects, the UE 602 may use a dropping rule (in other words, a priority rule) when a collision occurs between the additional SRS and a next uplink transmission at 612. By way of example, FIG. 8 shows a diagram 800 illustrating example rules, such as the dropping rule, for addressing a collision between additional SRS and a next uplink transmission. As illustrated in FIG. 8, the SRS symbol 804a and the SRS symbol 804b in the additional SRS overlaps in time with the retuning time 806 for a PUSCH 808. The UE 602 or the base station 604 may drop transmission of the SRS symbol 804a and the SRS symbol 804b according to the example dropping rule. Similarly, in some aspects, the scheduling may indicate for the UE 602 to avoid collisions between the additional SRS and a next uplink channel and may indicate for the UE to use a dropping rule for a collision between the additional SRS and a previous uplink transmission.

In some aspects, the scheduling may indicate for the UE 602 to not avoid collisions between additional SRS and a previous or next uplink channels/signals and may indicate for the UE to use a dropping rule for collisions.

At 610, the UE 602 may identify a collision. The UE may identify the collision based on determining that the uplink signal overlaps in time with the SRS or the retuning time. The UE 602 may drop or delay one or more additional SRS symbols based on the scheduling and a dropping rule to address the collision.

In some aspects, the dropping rule may define that hybrid automatic repeat request (HARQ) transmissions, SR, RI/PTI/CRI, and physical random access channel (PRACH) take priority over aperiodic SRS in the first set of SRS with carrier switching, which takes priority over aperiodic SRS in the additional SRS symbols with carrier switching, which takes priority over aperiodic CSI, which takes priority over periodic SRS in the first set of SRS with carrier switching, which takes priority over other CSI, which takes priority over SRS without carrier switching. In some aspects, the dropping rule may provide that the entirety of the additional SRS may be dropped if at least one symbol (including the retuning time) is in collision with a transmission of higher priority. Alternatively, the dropping rule may provide that the colliding SRS symbols that collide with a transmission of higher priority may be dropped.

In some aspects, the UE 602 may be configured with SRS flexible timing. In some aspects, the UE 602 may delay all of the first set of SRS symbol(s) to a next SRS occasion once, where the SRS occasion is a set of subframes configured for aperiodic SRS transmission, in response to determining, at 610, that the collision between the uplink transmission on the source CC and the first set of SRS symbol(s). After postponing the SRS, if there is a new collision the SRS may be dropped according to the dropping rules. In such aspects, the UE may delay, at 612, the aperiodic SRS on all of the additional SRS symbols to a next SRS occasion once, in response to determining, at 610, that the collision between the uplink transmission on the source CC and the additional SRS symbols. In some aspects, the UE 602 may delay the aperiodic SRS on a subset of additional SRS symbols that collide with a higher priority uplink transmission during a duration of time that includes the retuning time and transmission time for the uplink transmission while transmitting remaining non-overlapped SRS symbols. In some aspects, the UE 602 may drop all of the additional SRS symbols in accordance with a dropping rule. In some aspects, the UE 602 may drop the overlapped subset of SRS symbols and transmit the remaining non-overlapped SRS symbols.

Figure 9:
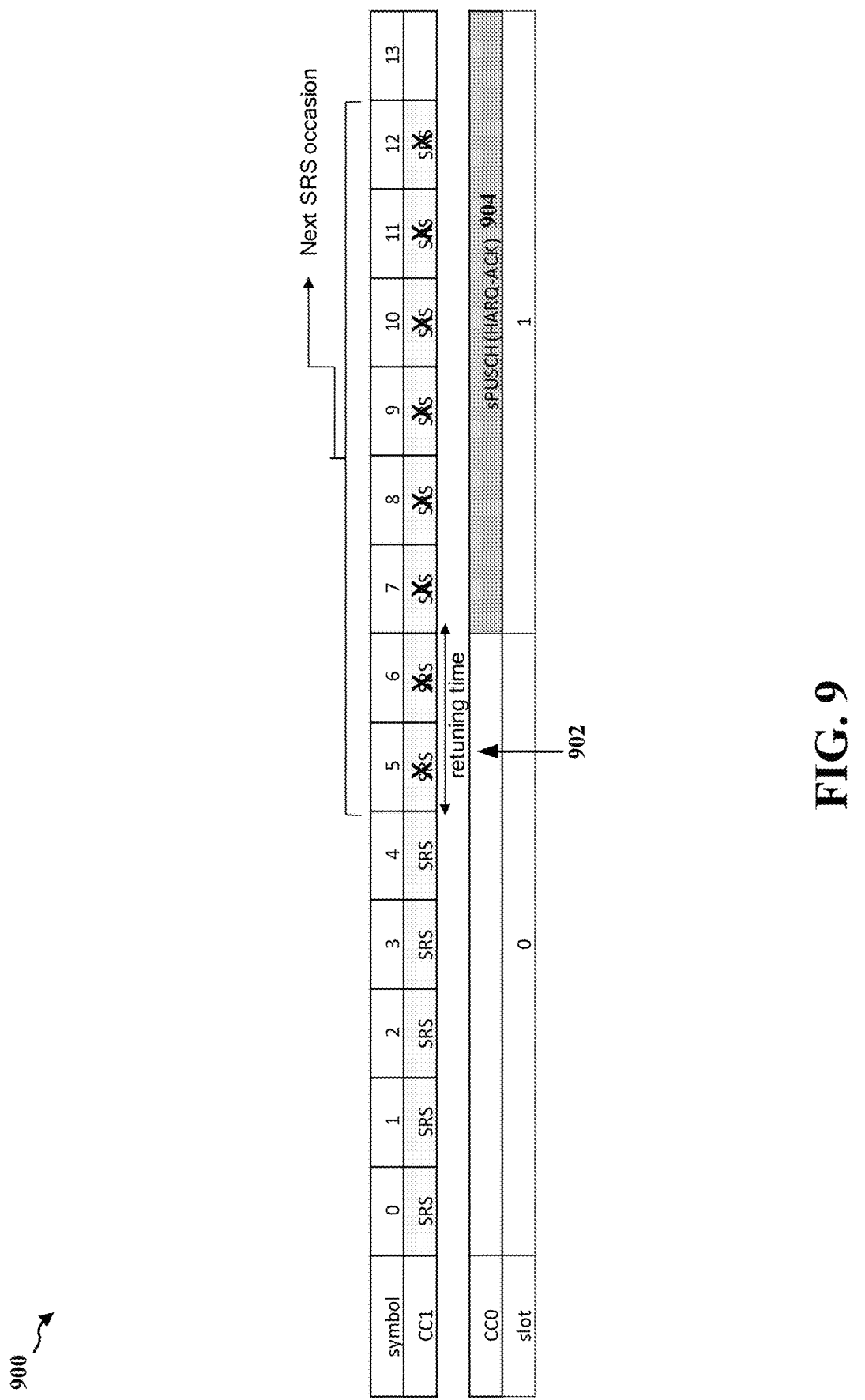
FIG. 9 shows a diagram illustrating example rules for addressing uplink collisions with flexible SRS timing in accordance with some aspects of the present disclosure.

For example, FIG. 9 shows a diagram 900 illustrating dropping rules for uplink collisions with flexible SRS timing. As illustrated in FIG. 9, some of the additional SRS symbols at slots 5-13 collide with a HARQ acknowledgment transmission 904 because the additional SRS symbols overlap in time with a retuning time 902 for the HARQ acknowledgment transmission 904. As a result, the UE may commence the additional SRS symbols in a next SRS occasion.

Figure 10:
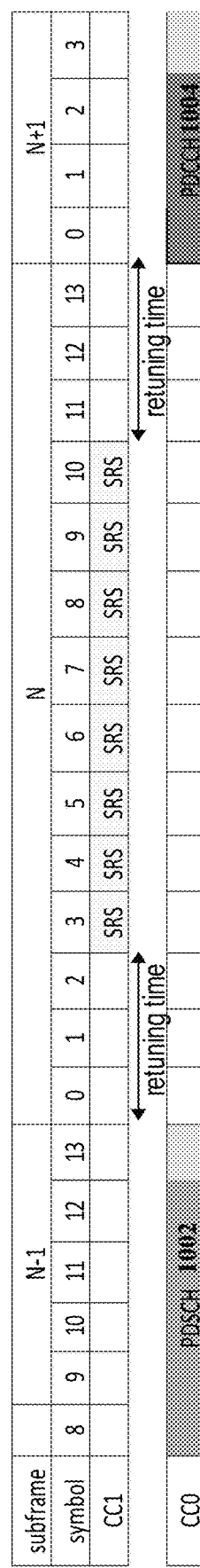
FIG. 10 shows a diagram illustrating example scheduling for downlink transmissions in accordance with some aspects of the present disclosure.

In some aspects, at 608a, the base station may schedule the UE 602 to avoid a collision between a downlink transmission on the source CC and the additional SRS symbols of the aperiodic SRS on the destination CC. The UE 602 may further receive a scheduling from base station 604 at 608b for an aperiodic SRS on additional SRS symbols relative to the first set of SRS symbols in an uplink subframe with SRS switching from the source CC to a destination CC. The UE may then determine a collision between the downlink transmission on the source CC and the additional SRS symbols of the aperiodic SRS on the destination CC. In some aspects, the scheduling may indicate for the UE 602 to avoid a collision between the additional SRS symbols and a previous PDSCH. In some aspects, the scheduling may indicate for the UE 602 to avoid a collision between the additional SRS symbols and a next PDCCH. In some aspects, the scheduling may indicate for the UE 602 to avoid a collision between the additional SRS symbols and a next PDCCH or a previous PDSCH. As an example, FIG. 10 shows a diagram 1000 illustrating scheduling for downlink transmissions that avoids collision with a next PDCCH 1004 and a previous PDSCH 1002. In some aspects, the scheduling may limit the symbols for the additional SRS to be in a range of $\{N_{symb}^{retune}, (N_{symb}^{retune}+1), \ldots,$ number of total SRS symbols, such as $13\}$. $N_{symb}^{retune}$ is a symbol number for retuning. In some aspects, the UE is not expected to monitor PDCCH on a different CC if the PDCCH overlaps in time with the SRS transmission on the additional SRS symbols (including any interruption due to uplink or downlink RF retuning time) with carrier switching, and if the UE is not capable of simultaneous reception and transmission on multiple CCs.

In some aspects, the scheduling may indicate that the UE may not monitor PDCCH or PDSCH in subframes impacted by the collision. In some aspects, the scheduling may indicate that the UE is not expected to be configured with switching that will interrupt downlink reception in one or more subframes, such as subframe 0/5, if the additional SRS symbols may collide with PDCCH. For a TDD CC, not configured for PUSCH/PUCCH transmission, the UE is not expected to be configured with SRS resource(s) such that the SRS transmission on additional SRS symbols (including any interruption due to uplink or downlink RF retuning time) may overlap in time with PDCCH monitoring in subframes 0 or 5 on a different cell if the UE is not capable of simultaneous transmission and reception of multiple CCs.

In some aspects, the scheduling schedules communication with the UE 602, including the aperiodic SRS on the additional SRS symbols based on the UE capability.

Figure 11:
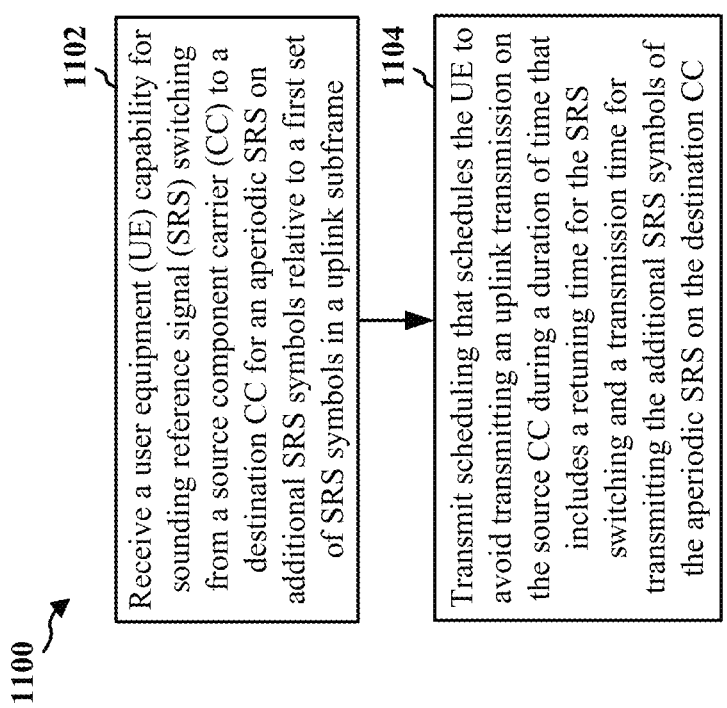
FIG. 11 shows a flowchart illustrating an example method of wireless communication performed at a base station that supports scheduling of additional SRS to address uplink collisions in accordance with some aspects of the present disclosure.

FIG. 11 shows a flowchart illustrating a method of wireless communication 1100 performed at a base station that supports scheduling of additional SRS to address uplink collisions in accordance with some aspects of the present disclosure. The method may be performed by a base station or a component of a base station (such as the base station 102, 180, 310, or 604; a processing system, which may include the memory 376 and which may be the entire base station 310 or a component of the base station 310, such as the TX processor 316, the RX processor 370, or the controller/processor 375). The method illustrated in FIG. 11 may be performed by a base station in communication with a UE, such as the UE 104, 350, or 602.

As illustrated in block 1102, the base station receives a UE capability for SRS switching from a source CC to a destination CC for an aperiodic SRS on additional SRS symbols relative to a first set of SRS symbols. For example, the reception may be performed by the reception component 1830 or the UE capability component 1840 of the apparatus 1802 in FIG. 18. The reception at 1102 may include aspects described in conjunction with 606a of FIG. 6 and FIGS. 7 to 10. For example, the base station 604 may receive a UE capability 606a for SRS switching from a source CC to a destination CC for an aperiodic SRS on additional SRS symbols relative to a first set of SRS symbols from the UE 602. In some aspects, the UE capability is dependent on the UE type or scenarios, with no explicit signaling. For example, when the UE is a type of MTC (machine type communication) or NB-IoT (narrowband internet of things) with band limitation, coverage enhancement or low complexity, the UE cannot support additional SRS transmission so that the UE is not expected to be configured with the SRS parameters for additional SRS. Another example is that when the UE is configured with multiple cell groups used for dual connectivity, the UE cannot support additional SRS transmission so that the UE is not expected to be configured with the SRS parameters for additional SRS.

As illustrated in block 1104, the base station transmits scheduling that schedules the UE to avoid transmitting an uplink transmission on the source CC during a duration of time that includes a retuning time for the SRS switching and a transmission time for transmitting the additional SRS symbols of the aperiodic SRS on the destination CC. For example, the base station 604 may transmit scheduling that schedules the UE 602 to avoid transmitting an uplink transmission on the source CC during a duration of time that includes a retuning time for the SRS switching and a transmission time for transmitting the additional SRS symbols of the aperiodic SRS on the destination CC. In some aspects, the transmission may be performed by the transmission component 1834 or the schedule component 1844 of the apparatus 1802 in FIG. 18. In some aspects, the scheduling schedules the UE for an uplink channel on the source CC that occurs prior to or after the additional SRS symbols to avoid transmission of the uplink channel on the source CC while transmitting the additional SRS symbols on the destination CC during a duration of time that includes the retuning time for the SRS switching. In some aspects, the scheduling indicates a limitation that limits transmission associated with the additional SRS symbols to within a time range based on a number of retuning symbols for the retuning time for the SRS switching.

In some aspects, the scheduling schedules the uplink transmission on the source CC to be prior to the additional SRS symbols. In some aspects, scheduling indicates a limitation that limits the additional SRS symbols to begin after the uplink transmission on the source CC and the retuning time. In some aspects, the scheduling schedules the uplink transmission on the source CC to be after the additional SRS symbols. In some aspects, the scheduling indicates a limitation that limits the uplink transmission on the source CC to avoid the overlap in time between the additional SRS symbols with the retuning time and at least a portion of the uplink transmission prior to or after the additional SRS symbols. The transmission at 1104 may include aspects described in conjunction with 608a of FIG. 6 and FIGS. 7 to 10.

Figure 12:
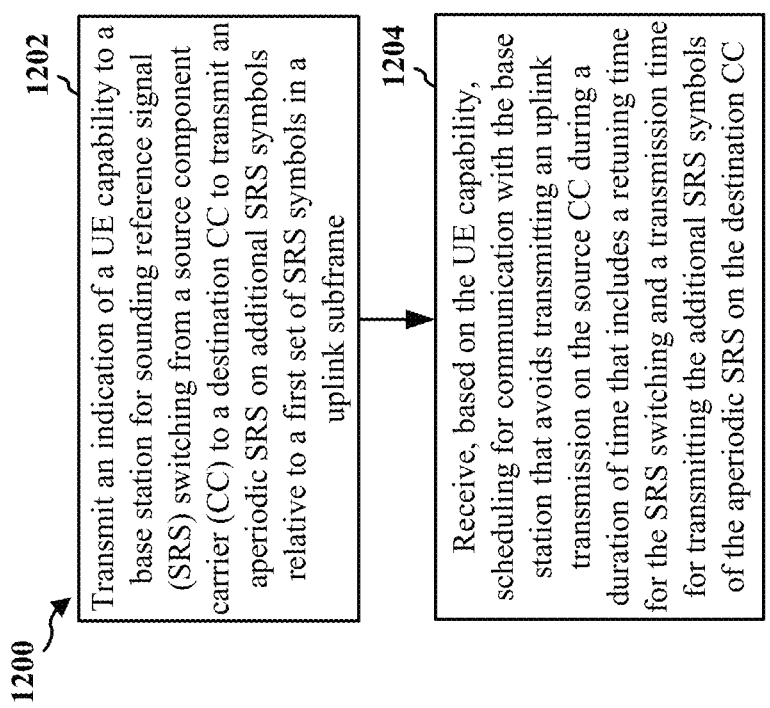
FIG. 12 shows a flowchart illustrating an example method of wireless communication performed at a UE that supports receiving scheduling of additional SRS to address uplink collisions in accordance with some aspects of the present disclosure.

FIG. 12 shows a flowchart illustrating a method of wireless communication 1200 performed at a UE that supports receiving scheduling of additional SRS to address uplink collisions in accordance with some aspects of the present disclosure. The method may be performed by a UE or a component of a UE (such as the UE 104, 350, or 602); a processing system, which may include the memory 360 and which may be the entire UE 350 or a component of the UE 350, such as the TX processor 368, the RX processor 356, or the controller/processor 359). The method illustrated in FIG. 12 may be performed by a UE in communication with a base station (such as the base station 102, 180, 310, or 604).

As illustrated in block 1202, the UE transmits indication of a UE capability to a base station for SRS switching from a source CC to a destination CC to transmit an aperiodic SRS on additional SRS symbols relative to a first set of SRS symbols. The transmission at 1202 may include aspects described in conjunction with 606a of FIG. 6 and FIGS. 7 to 10. For example, the UE 602 may transmit indication of a UE capability 606a to a base station 604 for SRS switching from a source CC to a destination CC to transmit an aperiodic SRS on additional SRS symbols relative to a first set of SRS symbols. In some aspects, the transmission may be performed by the UE capability component 1940 in the apparatus 1902 in FIG. 19.

As illustrated in block 1204, the UE receives, based on the UE capability, scheduling for communication with the base station that avoids transmitting an uplink transmission on the source CC during a duration of time that includes a retuning time for the SRS switching and a transmission time for transmitting the additional SRS symbols of the aperiodic SRS on the destination CC. For example, the UE 602 may receive, based on the UE capability 606a/606b, scheduling 608a/608b for communication with the base station 604 that avoids transmitting an uplink transmission on the source CC during a duration of time that includes a retuning time for the SRS switching and a transmission time for transmitting the additional SRS symbols of the aperiodic SRS on the destination CC. The scheduling may be received by the schedule component 1942 or the reception component 1930 of the apparatus 1902 in FIG. 19. In some aspects, the scheduling schedules the UE for an uplink channel on the source CC that occurs prior to or after the additional SRS symbols to avoid transmission of the uplink channel on the source CC while transmitting the additional SRS symbols on the destination CC during a duration of time that includes the retuning time for the SRS switching. In some aspects, the scheduling indicates a limitation that limits transmission associated with the additional SRS symbols to within a time range based on a number of retuning symbols for the retuning time for the SRS switching. In some aspects, the scheduling schedules the uplink transmission on the source CC to be prior to the additional SRS symbols. In some aspects, the scheduling indicates a limitation that limits the additional SRS symbols to begin after the uplink transmission on the source CC and the retuning time. In some aspects, the scheduling schedules the uplink transmission on the source CC to be after the additional SRS symbols. In some aspects, the scheduling indicates a limitation that limits the uplink transmission on the source CC to avoid the overlap in time between the additional SRS symbols with the retuning time and at least a portion of the uplink transmission prior to or after the additional SRS symbols. The reception at 1204 may include aspects described in conjunction with 608a of FIG. 6 and FIGS. 7 to 10.

Figure 13:
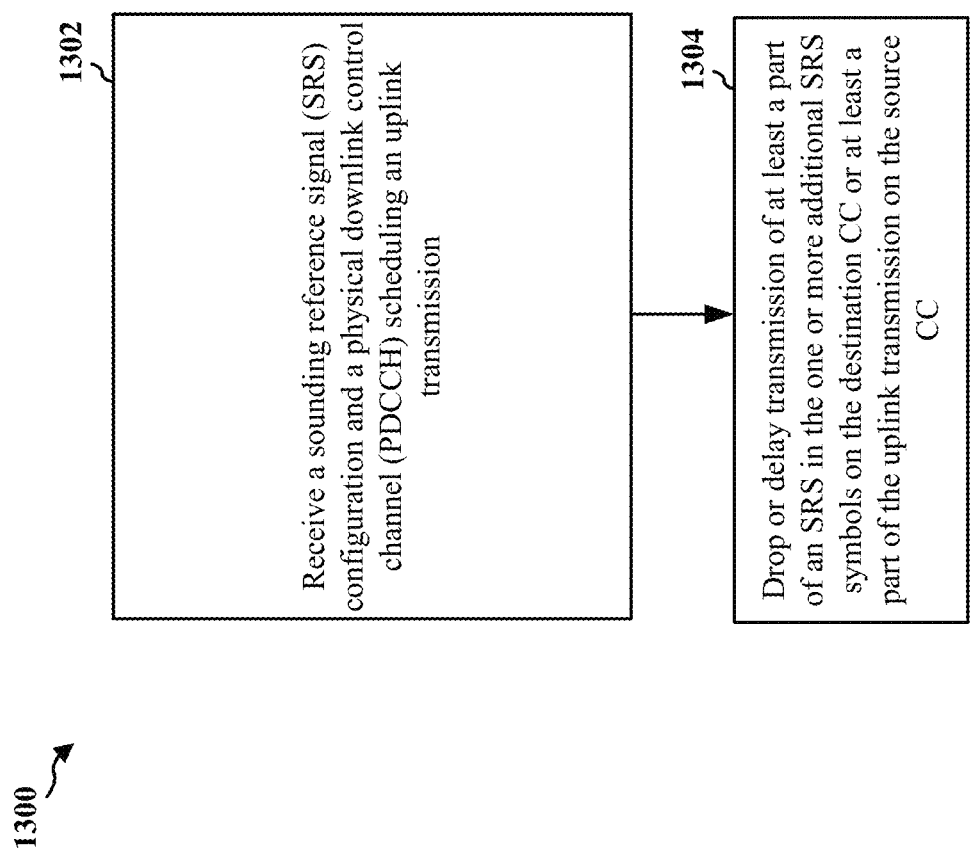
FIG. 13 shows a flowchart illustrating a method of wireless communication performed at a UE that supports dropping of additional SRS in accordance with some aspects of the present disclosure.

FIG. 13 shows a flowchart 1300 illustrating a method of wireless communication performed at a UE that supports dropping of additional SRS in accordance with some aspects of the present disclosure. The method may be performed by a UE or a component of a UE (such as the UE 104, 350, or 602); a processing system, which may include the memory 360 and which may be the entire UE 350 or a component of the UE 350, such as the TX processor 368, the RX processor 356, or the controller/processor 359). The method illustrated in FIG. 13 may be performed by a UE in communication with a base station (such as the base station 102, 180, 310, or 604).

As illustrated in block 1302, the UE receives a SRS configuration and a downlink transmission (such as PDCCH) scheduling an uplink transmission, the uplink transmission being scheduled on a CC, the SRS configuration comprising one or more additional SRS symbols relative to a first set of SRS symbols associated with an aperiodic trigger Type 1 or a periodic trigger Type 0, the one or more additional SRS symbols being scheduled on a destination CC at least one of the one or more additional SRS symbols overlapping at least partially with the uplink transmission. The reception at 1302 may include aspects described in conjunction with 610 of FIG. 6 and FIGS. 7 to 10. For example, the UE 602 may receive an SRS configuration and downlink transmission scheduling an uplink transmission, the uplink transmission being on a source component carrier (CC) from the base station 604. In some aspects, the reception may be performed by the overlap component 1944 of the apparatus 1902 in FIG. 19. In some aspects, a license assisted access (LAA) UE, band-limited/coverage-enhanced (BL/CE) UE, or a UE configured with multiple cell groups may not be configured with the one or more additional SRS symbols. In some aspects, the one or more additional SRS symbols may be Type 2 SRS symbols and the first set of SRS symbols may be Type 1 SRS symbols. In some aspects, the UE may not be a LAA UE, a BL/CE UE, or a UE configured with multiple cell groups may not be configured with the one or more additional SRS symbols.

As illustrated in block 1304, the UE may drop or delay transmission of at least a part of an SRS in the one or more additional SRS symbols on the destination CC or at least a part of the uplink transmission on the source CC. For example, the UE 602 may drop or delay at least a part of an SRS in the one or more additional SRS symbols on the destination CC or at least a part of the uplink transmission on the source CC. In some aspects, the drop or delay may be performed by the determination component 1946 of the apparatus 1902 in FIG. 19. In some aspects, the UE may drop the transmission of the SRS in the one or more additional SRS symbols based on the one or more additional SRS symbols being on a first serving cell in a first subframe that overlaps with a second subframe on a second serving cell, the first serving cell and the second serving cell being within a same serving cell set. For example, the UE may not be triggered to transmit type 2 SRS on serving cell d in subframe N that overlaps (including any interruption due to uplink or downlink RF retuning time) with uplink subframe N−1 on a serving cell in set S(d).

In some aspects, the UE may further use a priority rule, such as the dropping rule described in conjunction with FIG. 6, to determine whether to drop at least the part of the aperiodic SRS in the additional SRS symbols on the destination CC or at least the part of the uplink transmission on the source CC. In some aspects, the UE drops the aperiodic SRS in the additional SRS symbols on the destination CC if the uplink transmission includes at least one of: HARQ feedback, a SR, a RI, a PTI, a CSI-RS CRI, or a RACH. In some aspects, the UE drops the uplink transmission if the uplink transmission includes at least one of: aperiodic channel state information (A-CSI), channel state information other than HARQ feedback SR, RI, PTI, or CRI, another SRS not on a CC with PUSCH or PUCCH, or periodic SRS on a CC without PUSCH or PUCCH. In some aspects, the UE drops the aperiodic SRS in the additional SRS symbols on the destination CC if the uplink transmission includes at least one of: aperiodic SRS not in the additional SRS symbols on another CC without PUSCH or PUCCH. In some aspects, the UE drops the uplink transmission if the uplink transmission includes at least one of aperiodic SRS not in the additional SRS symbols on a CC without PUSCH or PUCCH. In some aspects, the UE may further drop the aperiodic SRS on each of the additional SRS symbols in response to determining that the overlap in time between a higher priority uplink transmission on the source CC and the additional SRS symbols. In some aspects, the UE may further drop the aperiodic SRS on the additional SRS symbols that overlap a higher priority uplink transmission including the retuning time for the SRS switching from the source CC to the destination CC. In some aspects, if SRS flexible timing is configured for the UE, the UE delays the aperiodic SRS on each of the additional SRS symbols in response to determining that the overlap in time between the uplink transmission on the source CC and the additional SRS symbols. In some aspects, if SRS flexible timing is configured for the UE, the UE delays the aperiodic SRS on the additional SRS symbols that overlap with a higher priority uplink transmission including the retuning time for the SRS switching from the source CC to the destination CC. In some aspects, if the UE drops the aperiodic SRS on each of the additional SRS symbols in response to determining that the overlap in time between the uplink transmission on the source CC and the additional SRS symbols. In some aspects, if the UE drops the aperiodic SRS on the additional SRS symbols that overlap a higher priority uplink transmission including the retuning time for the SRS switching from the source CC to the destination CC. In some aspects, the UE drops the transmission of the SRS on the one or more additional SRS symbols if SRS flexible timing is configured for the first set of SRS symbols and not for the one or more additional SRS symbols. In some aspects, the UE drops the transmission of the SRS on the one or more additional SRS symbols if SRS flexible timing is configured for the UE and the uplink transmission on the source CC having a higher priority than the one or more additional SRS symbols. The drop or delay at 1304 may include aspects described in conjunction with 608a and 612 of FIG. 6 and FIGS. 7 to 10.

Figure 14:
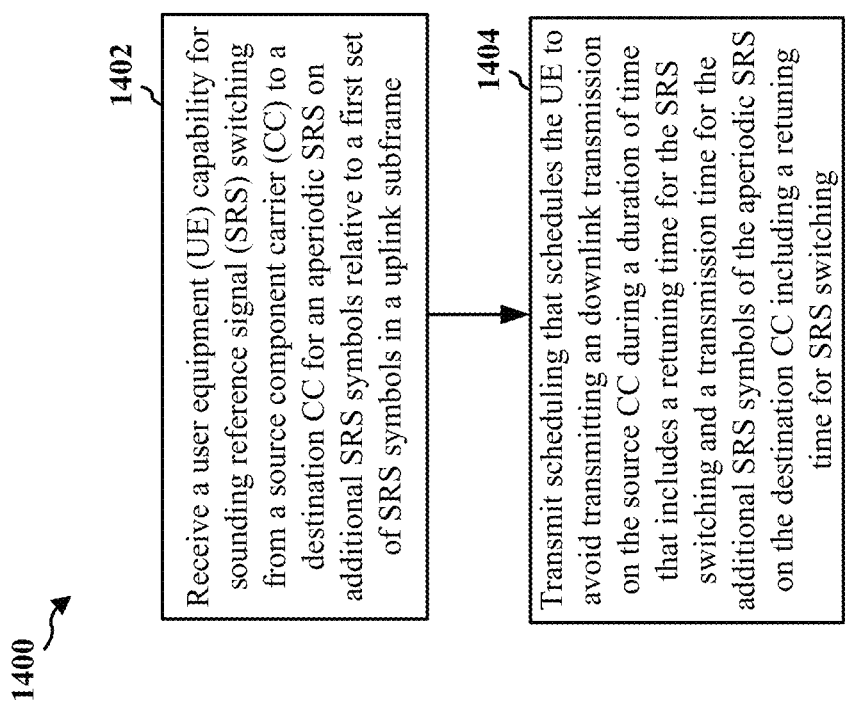
FIG. 14 shows a flowchart illustrating a method of wireless communication performed at a base station that supports scheduling of additional SRS to address downlink collisions in accordance with some aspects of the present disclosure.

FIG. 14 shows a flowchart illustrating a method of wireless communication 1400 performed at a base station that supports scheduling of additional SRS to address downlink collisions in accordance with some aspects of the present disclosure. The method may be performed by a base station or a component of a base station (such as the base station 102, 180, 310, or 604; a processing system, which may include the memory 376 and which may be the entire base station 310 or a component of the base station 310, such as the TX processor 316, the RX processor 370, or the controller/processor 375). The method illustrated in FIG. 14 may be performed by a base station in communication with a UE, such as the UE 104, 350, or 602.

As illustrated in block 1402, the base station receives a UE capability for SRS switching from a source CC to a destination CC for an aperiodic SRS on additional SRS symbols relative to a first set of SRS symbols. For example, the reception may be performed by the reception component 1830 or the UE capability component 1840 of the apparatus 1802 in FIG. 18. In some aspects, the UE is not capable of simultaneous reception/transmission in multiple CCs. The reception at 1402 may include aspects described in conjunction with 606a of FIG. 6.

As illustrated in block 1404, the base station transmits scheduling that schedules the UE to avoid transmitting a downlink transmission on the source CC during a duration of time that includes a retuning time for the SRS switching and a transmission time for the additional SRS symbols of the aperiodic SRS on the destination CC including a retuning time for SRS switching. For example, the transmission may be performed by the transmission component 1834 or the schedule component 1844 of the apparatus 1802 in FIG. 18. In some aspects, the downlink transmission includes a PDSCH or a PDCCH. In some aspects, the scheduling schedules the UE an uplink channel on the source CC that occurs prior to or after the additional SRS symbols and avoids transmission of the uplink channel on the source CC while transmitting the additional SRS symbols on the destination CC during a duration of time that includes the retuning time for the SRS switching. In some aspects, the scheduling includes a limitation that limits transmission associated with the additional SRS symbols to within a time range based on a number of retuning symbols for the retuning time for the SRS switching. In some aspects, the scheduling indicates a limitation limiting the additional SRS symbols including retuning time for SRS switching to potentially interrupting the reception or monitoring of downlink transmission in defined resources. The transmission at 1404 may include aspects described in conjunction with 608a of FIG. 6.

Figure 15:
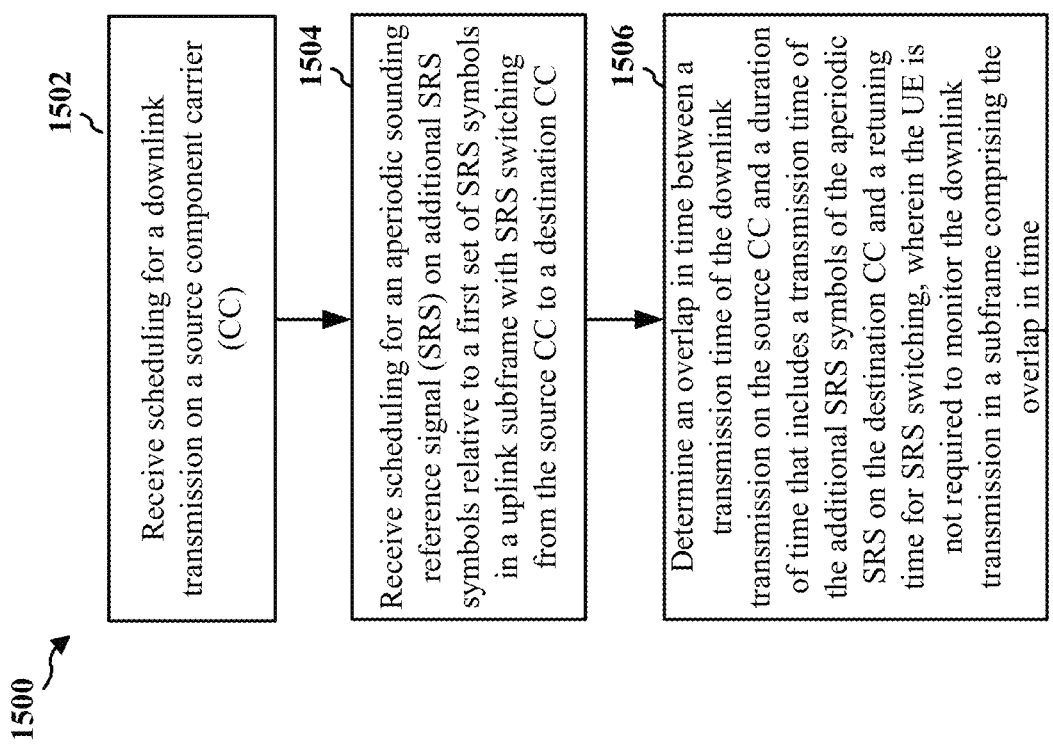
FIG. 15 shows a flowchart illustrating a method of wireless communication performed at a UE that supports receiving scheduling of additional SRS to address downlink collisions in accordance with some aspects of the present disclosure.

FIG. 15 shows a flowchart 1500 illustrating a method of wireless communication 1500 performed at a UE that supports receiving scheduling of additional SRS to address downlink collisions in accordance with some aspects of the present disclosure. The method may be performed by a UE or a component of a UE (such as the UE 104, 350, or 602); a processing system, which may include the memory 360 and which may be the entire UE 350 or a component of the UE 350, such as the TX processor 368, the RX processor 356, or the controller/processor 359). The method illustrated in FIG. 15 may be performed by a UE in communication with a base station (such as the base station 102, 180, 310, or 604).

As illustrated in block 1502, the UE receives scheduling for a downlink transmission on a source CC. In some aspects, the downlink transmission includes a PDSCH or a PDCCH. In some aspects, the UE is not capable of simultaneous reception/transmission in multiple CCs. The reception at 1502 may include aspects described in conjunction with 608*a* of FIG. 6. The scheduling may be received by the schedule component 1942 or the reception component 1930 of the apparatus 1902 in FIG. 19.

As illustrated in block 1504, the UE receives scheduling for an aperiodic SRS on additional SRS symbols relative to a first set of SRS symbols with SRS switching from the source CC to a destination CC. The reception at 1504 may include aspects described in conjunction with 608*b* of FIG. 6. The scheduling may be received by the schedule component 1942 or the reception component 1930 of the apparatus 1902 in FIG. 19.

As illustrated in block 1506, the UE determines an overlap in time between a transmission time of the downlink transmission on the source CC and a duration of time that includes a transmission time of the additional SRS symbols of the aperiodic SRS on the destination CC and a retuning time for SRS switching. The UE may not monitor the downlink transmission in a subframe including the overlap in time. The determination at 1506 may include aspects described in conjunction with 610 and 608*a* of FIG. 6. For example, the overlap may be determined by the overlap component 1944 of the apparatus 1902 in FIG. 19.

Figure 16:
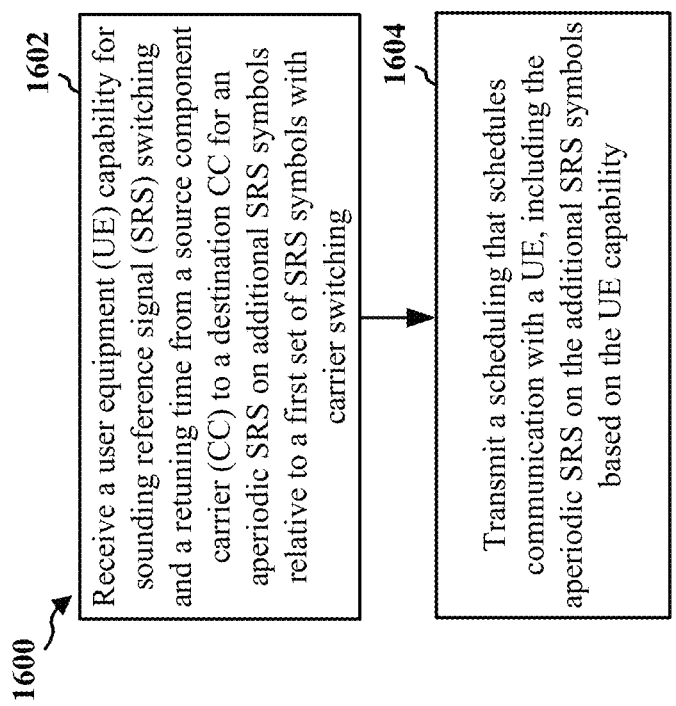
FIG. 16 shows a flowchart illustrating a method of wireless communication performed at a base station that supports scheduling of additional SRS in accordance with some aspects of the present disclosure.

FIG. 16 shows a flowchart illustrating a method of wireless communication 1600 performed at a base station that supports scheduling of additional SRS in accordance with some aspects of the present disclosure. The method may be performed by a base station or a component of a base station (such as the base station 102, 180, 310, or 604; a processing system, which may include the memory 376 and which may be the entire base station 310 or a component of the base station 310, such as the TX processor 316, the RX processor 370, or the controller/processor 375). The method illustrated in FIG. 16 may be performed by a base station in communication with a UE, such as the UE 104, 350, or 602.

As illustrated in block 1602, the base station receives a UE capability for SRS switching and a retuning time from a source CC to a destination CC for an aperiodic SRS on additional SRS symbols relative to a first set of SRS symbols with carrier switching. For example, the reception may be performed by the reception component 1830 or the UE capability component 1840 of the apparatus 1802 in FIG. 18. The base station may further receive an additional UE capability for the aperiodic SRS on the additional SRS symbols without the carrier switching. In some aspects, the UE may be a LAA UE. some aspects, UE capability indicates whether the UE supports the aperiodic SRS on the additional SRS symbols with carrier switching for a band combination. some aspects, the UE capability indicates whether the UE supports the aperiodic SRS on the additional SRS symbols with carrier switching for a band pair of a band combination. In some aspects, the UE capability indicates whether the UE supports a general capability for the aperiodic SRS on the additional SRS symbols with the carrier switching. In some aspects, the UE capability indicates, without reference to a band combination or band pair, whether the UE supports the aperiodic SRS on the additional SRS symbols with the carrier switching. The reception at 1602 may include aspects described in conjunction with FIG. 6.

As illustrated in block 1604, the base station transmits a scheduling that schedules communication with a UE, including the aperiodic SRS on the additional SRS symbols based on the UE capability. For example, the transmission may be performed by the transmission component 1834 or the schedule component 1844 of the apparatus 1802 in FIG. 18. In some aspects, the base station disables SRS carrier switching if a carrier for dual connectivity is configured with the aperiodic SRS on the additional SRS symbols with the carrier switching. In some aspects, the base station determines that a bandwidth reduced low complexity (BL)/coverage enhanced (CE) UE does not support the aperiodic SRS on the additional SRS symbols with carrier switching. In some aspects, the base station determines that a BL/CE UE support the aperiodic SRS on the additional SRS symbols without carrier switching but does not support the aperiodic SRS on the additional SRS symbols with carrier switching. In some aspects, the base station determines that a BL/CE UE in CEMode B does not support the aperiodic SRS on the additional SRS symbols. In some aspects, dual connectivity UEs may not support additional SRS with carrier switching and SRS carrier switching on such UEs may be disabled. Alternatively, transmission of additional SRSs may be disabled during carrier switching. The transmission at 1604 may include aspects described in conjunction with FIG. 6.

Figure 17:
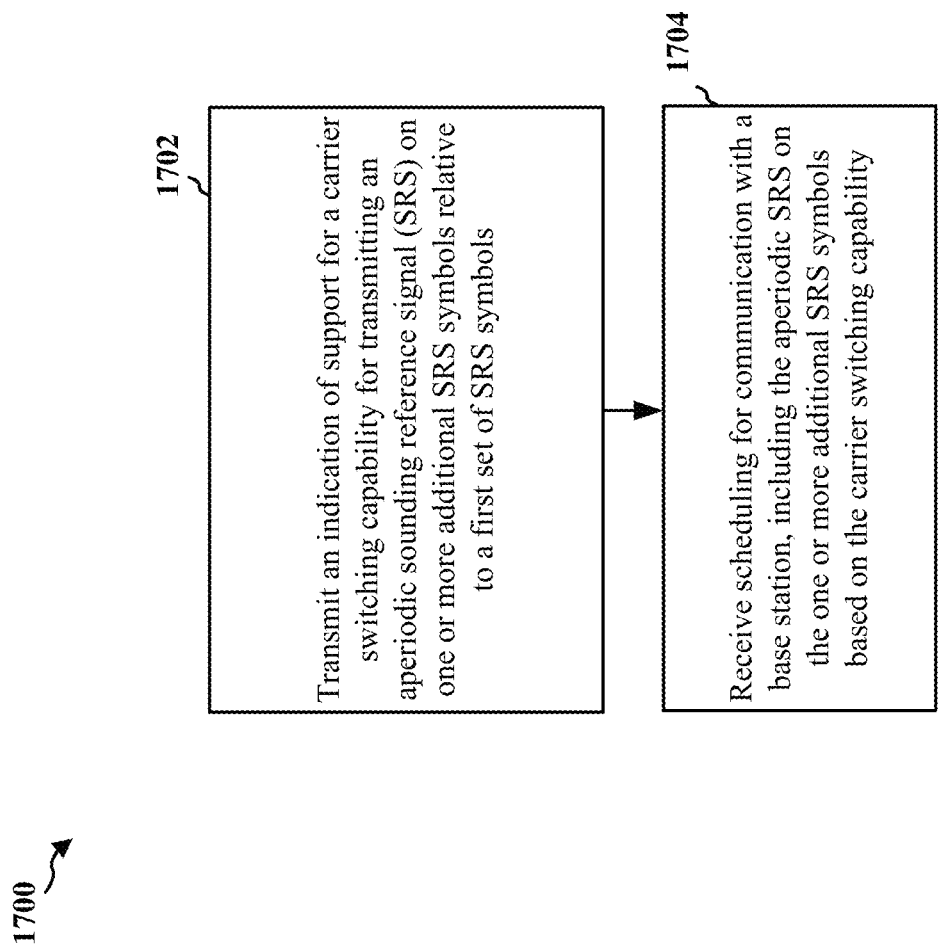
FIG. 17 shows a flowchart illustrating a method of wireless communication performed at a UE that supports scheduling of additional SRS in accordance with some aspects of the present disclosure.

FIG. 17 shows a flowchart illustrating a method of wireless communication 1700 performed at a UE that supports scheduling of additional SRS in accordance with some aspects of the present disclosure. The method may be performed by a UE or a component of a UE (such as the UE 104, 350, or 602); a processing system, which may include the memory 360 and which may be the entire UE 350 or a component of the UE 350, such as the TX processor 368, the RX processor 356, or the controller/processor 359). The method illustrated in FIG. 17 may be performed by a UE in communication with a base station (such as the base station 102, 180, 310, or 604).

As illustrated in block 1702, the UE may transmit an indication of support for a carrier switching capability for transmitting an aperiodic SRS on one or more additional SRS symbols relative to a first set of SRS symbols associated with an aperiodic trigger Type 1 or a periodic trigger Type 0, the one or more additional SRS symbols being associated with SRS switching from a source component carrier CC to a destination CC and being on the destination CC. For example, the UE 602 may transmit an indication of support (UE capability 606*a*/606*b*) for a carrier switching capability for an aperiodic SRS on one or more additional SRS symbols relative to a first set of SRS symbols associated with an aperiodic trigger Type 1 or a periodic trigger Type 0, the one or more additional SRS symbols being associated with SRS switching from a source component carrier CC to a destination CC and being on the destination CC. The UE may be a LAA UE. The transmission at 1702 may include aspects described in conjunction with 606*a*/606*b* of FIG. 6. In some aspects, the transmission may be performed by the UE capability component 1940 in the apparatus 1902 in FIG. 19.

In some aspects, the indication indicates whether the UE supports the aperiodic SRS on the additional SRS symbols with the carrier switching for a band combination. In some aspects, the indication indicates whether the UE supports the aperiodic SRS on the additional SRS symbols with the carrier switching for a band pair of a band combination. In some aspects, the indication indicates whether the UE supports a general capability for the aperiodic SRS on the additional SRS symbols with the carrier switching. In some aspects, the indication is indicated without reference to a band combination. In some aspects, the indication indicates the UE does not support the aperiodic SRS on the one or more additional SRS symbols with the carrier switching in a license assisted access carrier.

As illustrated in block 1704, the UE receives scheduling for communication with a base station, including the aperiodic SRS on the one or more additional SRS symbols based on the carrier switching capability. The reception at 1704 may include aspects described in conjunction with 608a of FIG. 6. The scheduling may be received by the schedule component 1942 or the reception component 1930 of the apparatus 1902 in FIG. 19.

Figure 18:
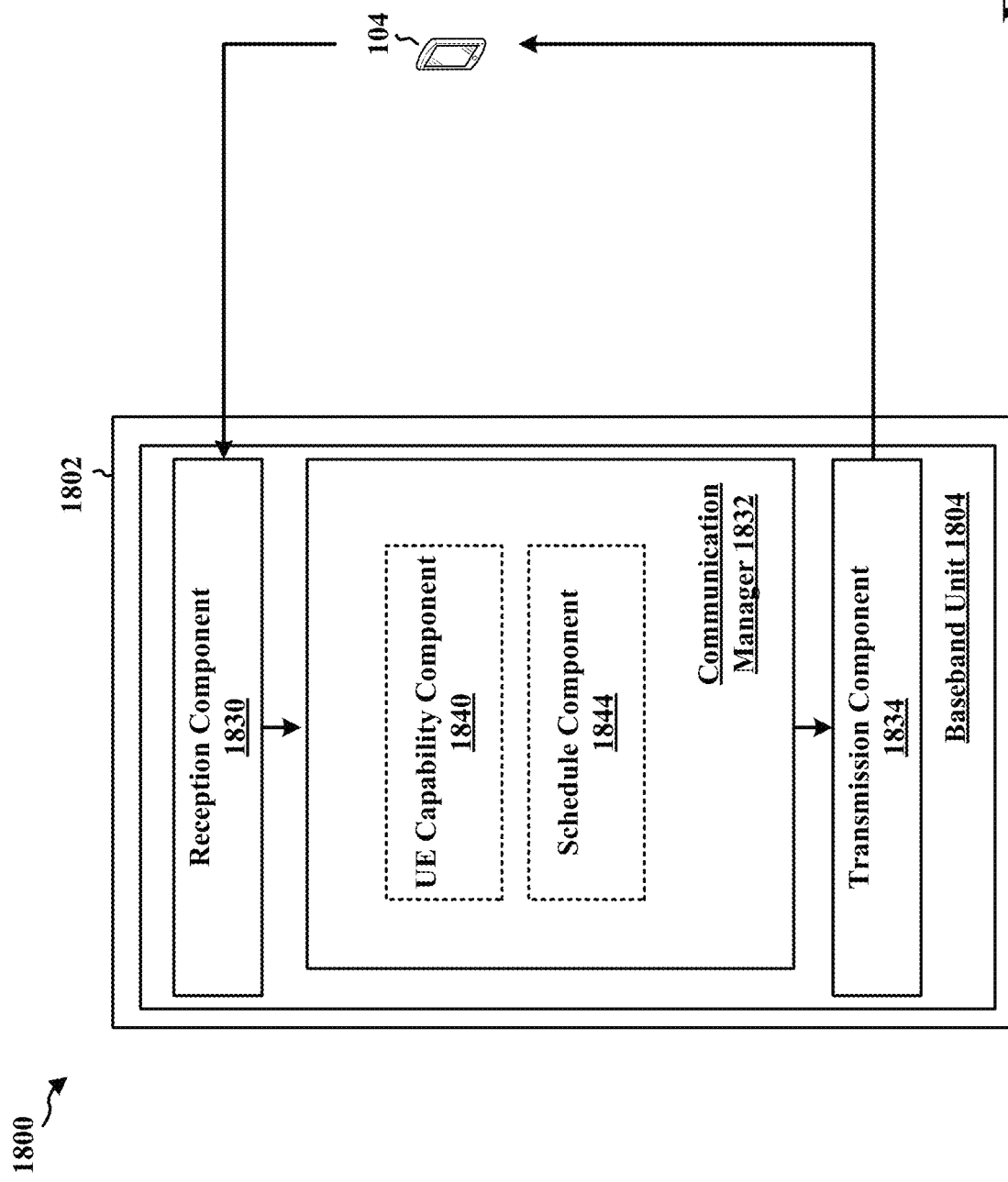
FIG. 18 is a diagram illustrating an example of a hardware implementation for an example apparatus that may perform aspects described in connection with the flowcharts in FIGS. 11, 14, and 16, in accordance with some aspects of the present disclosure.

FIG. 18 is a diagram 1800 illustrating an example of a hardware implementation for an apparatus 1802. The apparatus 1802 is a BS and includes a baseband unit 1804. The baseband unit 1804 may communicate through a cellular RF transceiver with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory or configured as hardware within the baseband unit 1804. The baseband unit 1804 may be a component of the BS 310 and may include the memory 376 or at least one of the TX processor 316, the RX processor 370, and the controller/processor 375.

The communication manager 1832 includes a UE capability component 1840 and a schedule component 1844 that may be configured to perform the aspects described in connection with any of FIG. 11, 14, or 16.

The apparatus may include additional components that perform each of the blocks of the algorithm in the aforementioned flowcharts of FIG. 11, 14, or 16. As such, each block in the aforementioned flowcharts of FIG. 11, 14, or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for performing any of the aspects described in connection with FIG. 11, FIG. 14, or FIG. 16. The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
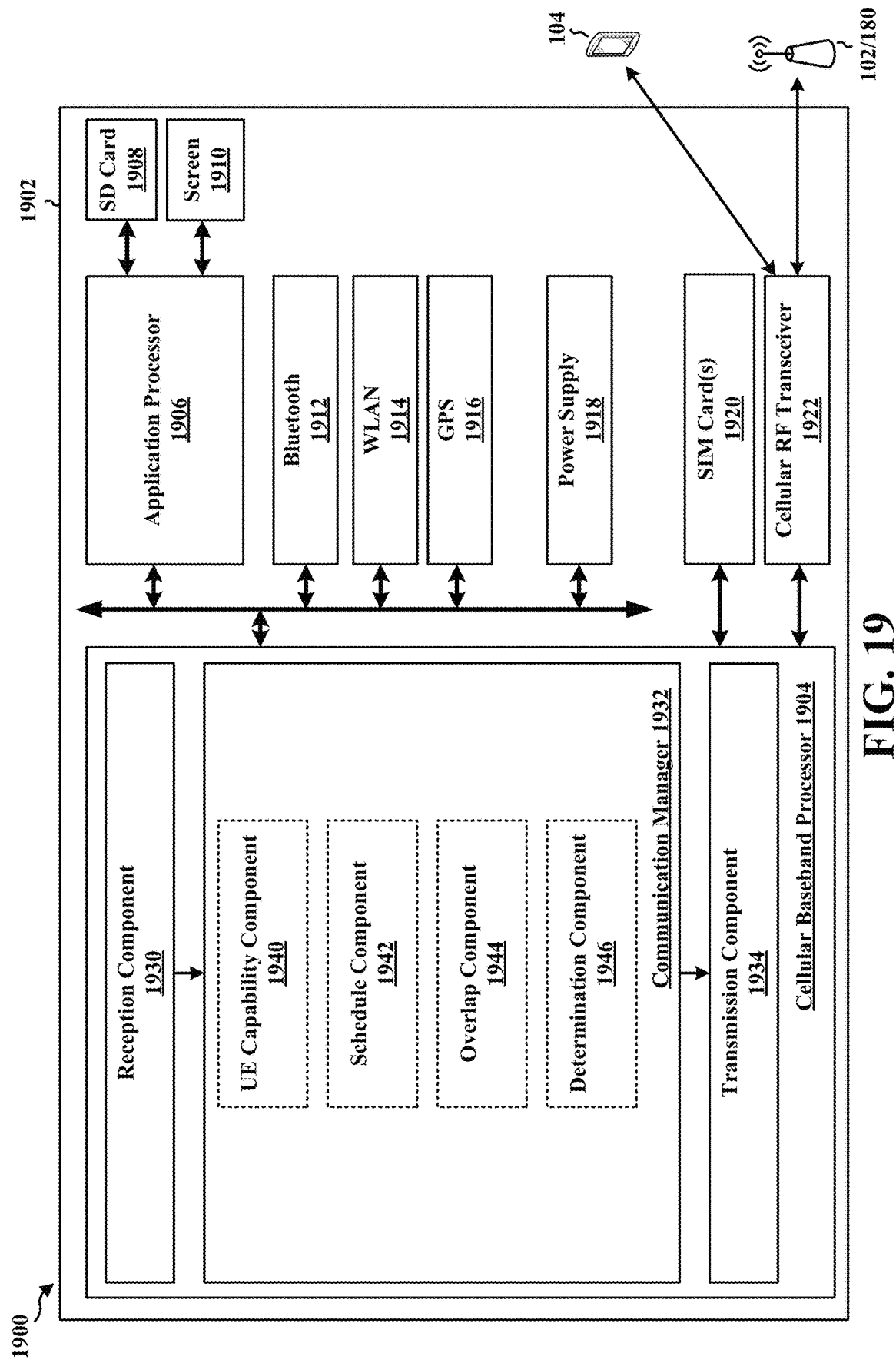
FIG. 19 is a diagram illustrating an example of a hardware implementation for an example apparatus that may perform aspects described in connection with the flowcharts in FIGS. 12, 13, 15, and 17, in accordance with some aspects of the present disclosure.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 or BS 102/180. The cellular baseband processor 1904 may include a computer-readable medium/memory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory or configured as hardware within the cellular baseband processor 1904. The cellular baseband processor 1904 may be a component of the UE 350 and may include the memory 360 or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (such as 350 of FIG. 3) and include the additional modules of the apparatus 1902.

The communication manager 1932 includes a UE capability component 1940, a schedule component 1942, an overlap component 1944, and a determination component 1946 that is configured to perform the aspects described in connection with the flowcharts of FIG. 12, FIG. 13, FIG. 15, or FIG. 17.

The apparatus may include additional components that perform each of the blocks of the algorithm in the aforementioned flowcharts of FIG. 12, FIG. 13, FIG. 15, or FIG. 17. As such, each block in the aforementioned flowcharts of FIG. 12, FIG. 13, FIG. 15, or FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for performing any of the aspects described in connection with FIG. 12, FIG. 13, FIG. 15, or FIG. 17. The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. The term "or" may refer to "or". For example, "A, B, or C" may include any combination of A, B, or C as stated above. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a base station, comprising: receiving a UE capability for SRS switching from a source CC to a destination CC for an aperiodic SRS on additional SRS symbols relative to a first set of SRS symbols in a uplink subframe; and transmitting scheduling that schedules the UE to avoid transmitting an uplink transmission on the source CC during a duration of time that includes a retuning time for the SRS switching and a transmission time for transmitting the additional SRS symbols of the aperiodic SRS on the destination CC.

Aspect 2 is the method of aspect 1, wherein the scheduling schedules the UE for an uplink channel on the source CC that occurs prior to or after the additional SRS symbols to avoid transmission of the uplink channel on the source CC while transmitting the additional SRS symbols on the destination CC during a duration of time that includes the retuning time for the SRS switching.

Aspect 3 is the method of any of aspects 1-2, wherein the scheduling indicates a limitation that limits transmission associated with the additional SRS symbols to within a time range based on a number of retuning symbols for the retuning time for the SRS switching.

Aspect 4 is the method of any of aspects 1-3, wherein the scheduling schedules the uplink transmission on the source CC to be prior to the additional SRS symbols.

Aspect 5 is the method of any of aspects 1-4, wherein the scheduling indicates a limitation that limits the additional SRS symbols to begin after the uplink transmission on the source CC and the retuning time.

Aspect 6 is the method of any of aspects 1-5, wherein the scheduling schedules the uplink transmission on the source CC to be after the additional SRS symbols.

Aspect 7 is the method of any of aspects 1-6, wherein the scheduling indicates a limitation that limits the uplink transmission on the source CC to avoid an overlap in time between the additional SRS symbols with the retuning time and at least a portion of the uplink transmission prior to or after the additional SRS symbols.

Aspect 8 is a method of wireless communication at a UE, comprising: transmitting an indication of a UE capability to a base station for SRS switching from a source CC to a destination CC to transmit an aperiodic SRS on additional SRS symbols relative to a first set of SRS symbols in a uplink subframe; and receiving, based on the UE capability, scheduling for communication with the base station that avoids transmitting an uplink transmission on the source CC during a duration of time that includes a retuning time for the SRS switching and a transmission time for transmitting the additional SRS symbols of the aperiodic SRS on the destination CC.

Aspect 9 is the method of aspect 8, wherein the scheduling schedules the UE for an uplink channel on the source CC that occurs prior to or after the additional SRS symbols to avoid transmission of the uplink channel on the source CC while transmitting the additional SRS symbols on the destination CC during the duration of time that includes the retuning time for the SRS switching.

Aspect 10 is the method of any of aspects 8-9, wherein the scheduling indicates a limitation that limits transmission associated with the additional SRS symbols to within a time range based on a number of retuning symbols for the retuning time for the SRS switching.

Aspect 11 is the method of any of aspects 8-10, wherein the scheduling schedules the uplink transmission on the source CC to be prior to the additional SRS symbols.

Aspect 12 is the method of any of aspects 8-11, wherein the scheduling indicates a limitation that limits the additional SRS symbols to begin after the uplink transmission on the source CC and the retuning time.

Aspect 13 is the method of any of aspects 8-12, wherein the scheduling schedules the uplink transmission on the source CC to be after the additional SRS symbols.

Aspect 14 is the method of any of aspects 8-13, wherein the scheduling indicates a limitation that limits the uplink transmission on the source CC to avoid the overlap in time between the additional SRS symbols with the retuning time and at least a portion of the uplink transmission prior to or after the additional SRS symbols.

Aspect 15 is a method of wireless communication at a base station, comprising: receiving a UE capability for SRS switching from a source CC to a destination CC for an aperiodic SRS on additional SRS symbols relative to a first set of SRS symbols in a uplink subframe; and transmitting scheduling that schedules the UE to avoid transmitting an downlink transmission on the source CC during a duration of time that includes a retuning time for the SRS switching and a transmission time for the additional SRS symbols of the aperiodic SRS on the destination CC including the retuning time for SRS switching.

Aspect 16 is the method of aspect 15, wherein the downlink transmission comprises a PDSCH or a PDCCH.

Aspect 17 is the method of any of aspects 15-16, wherein the scheduling schedules the UE an uplink channel on the source CC that occurs prior to or after the additional SRS symbols and avoids transmission of the uplink channel on the source CC while transmitting the additional SRS symbols on the destination CC during the duration of time that includes the retuning time for the SRS switching.

Aspect 18 is the method of any of aspects 15-17, wherein the scheduling includes a limitation that limits transmission associated with the additional SRS symbols to within a time range based on a number of retuning symbols for the retuning time for the SRS switching.

Aspect 19 is the method of any of aspects 15-18, wherein the scheduling indicates a limitation limiting the additional SRS symbols including retuning time for SRS switching to potentially interrupting the reception or monitoring of the downlink transmission in predefined resources.

Aspect 20 is the method of any of aspects 15-19, where the UE is not capable of simultaneous reception/transmission in multiple CCs.

Aspect 21 is a method of wireless communication at a base station, comprising: receiving a UE capability for SRS switching and a retuning time from a source CC to a destination CC for an aperiodic SRS on additional SRS symbols relative to a first set of SRS symbols with carrier switching; and scheduling communication with a UE, including the aperiodic SRS on the additional SRS symbols based on the UE capability.

Aspect 22 is the method of aspect 21, further comprising: receiving an additional UE capability for the aperiodic SRS on the additional SRS symbols without the carrier switching.

Aspect 23 is the method of any of aspects 21-22, wherein the UE comprises a LAA UE.

Aspect 24 is the method of any of aspects 21-23, wherein the UE capability indicates whether the UE supports the aperiodic SRS on the additional SRS symbols with carrier switching for a band combination.

Aspect 25 is the method of any of aspects 21-24, wherein the UE capability indicates whether the UE supports the aperiodic SRS on the additional SRS symbols with carrier switching for a band pair of a band combination.

Aspect 26 is the method of any of aspects 21-25, wherein the UE capability indicates whether the UE supports a general capability for the aperiodic SRS on the additional SRS symbols with the carrier switching.

Aspect 27 is the method of any of aspects 21-26, wherein the UE capability indicates, without reference to a band combination or band pair, whether the UE supports the aperiodic SRS on the additional SRS symbols with the carrier switching.

Aspect 28 is the method of any of aspects 21-27, further comprising: disabling SRS carrier switching if a carrier for dual connectivity is configured with the aperiodic SRS on the additional SRS symbols with the carrier switching.

Aspect 29 is the method of any of aspects 21-28, wherein the base station determines that a BL/CE UE does not support the aperiodic SRS on the additional SRS symbols with carrier switching.

Aspect 30 is the method of any of aspects 21-29, wherein the base station determines that a BL/CE UE support the aperiodic SRS on the additional SRS symbols without carrier switching but does not support the aperiodic SRS on the additional SRS symbols with carrier switching.

Aspect 31 is the method of any of aspects 21-30, wherein the base station determines that a BL/CE UE in CEMode B does not support the aperiodic SRS on the additional SRS symbols.

Aspect 32 is a method of wireless communication at a UE, comprising: receiving a SRS configuration and a downlink transmission scheduling an uplink transmission, the uplink transmission being scheduled on a CC, the SRS configuration comprising one or more additional SRS symbols relative to a first set of SRS symbols associated with an aperiodic trigger Type 1 or a periodic trigger Type 0, the one or more additional SRS symbols being scheduled on a destination CC at least one of the one or more additional SRS symbols overlapping at least partially with the uplink transmission; and dropping or delaying transmission of at least a part of an SRS in the one or more additional SRS symbols on the destination CC or at least a part of the uplink transmission on the source CC.

Aspect 33 is the method of aspect 32, wherein the UE drops the transmission of the SRS in the one or more additional SRS symbols based on the one or more additional SRS symbols being on a first serving cell in a first subframe that overlaps with a second subframe on a second serving cell, the first serving cell and the second serving cell being within a same serving cell set.

Aspect 34 is the method of any of aspects 32-33, further comprising: using a priority rule to determine whether to drop at least the part of the SRS in the one or more additional SRS symbols on the destination CC or at least the part of the uplink transmission on the source CC.

Aspect 35 is the method of any of aspects 32-34, wherein the UE drops the transmission of the SRS in the one or more additional SRS symbols on the destination CC based on the uplink transmission comprising at least one of: HARQ feedback, a SR, a RI, a PTI, a CSI-RS CRI, or a RACH.

Aspect 36 is the method of any of aspects 32-35, wherein the UE drops the uplink transmission based on the uplink transmission comprising at least one of: A-CSI, channel state information other than HARQ feedback SR, RI, PTI, or CRI, another SRS not on a CC with PUSCH or PUCCH, or periodic SRS on a CC without PUSCH or PUCCH.

Aspect 37 is the method of any of aspects 32-36, wherein the UE drops the transmission of the SRS in the one or more additional SRS symbols on the destination CC based on the uplink transmission comprising aperiodic SRS not in the one or more additional SRS symbols on another CC without PUSCH or PUCCH.

Aspect 38 is the method of any of aspects 32-37, wherein the UE drops the uplink transmission based on the uplink transmission comprising an aperiodic SRS not in the one or more additional SRS symbols on a CC without PUSCH or PUCCH.

Aspect 39 is the method of any of aspects 32-38, further comprising: dropping the transmission of the SRS on the one or more additional SRS symbols, wherein the uplink transmission on the source CC has a higher priority than the one or more additional SRS symbols.

Aspect 40 is the method of any of aspects 32-39, further comprising: dropping the transmission of the SRS on the one or more additional SRS symbols, wherein the uplink transmission on the source CC has a higher priority than the one or more additional SRS symbols.

Aspect 41 is the method of any of aspects 32-40, wherein the UE drops the transmission of the SRS on the one or more additional SRS symbols if SRS flexible timing is configured for the first set of SRS symbols and not for the one or more additional SRS symbols.

Aspect 42 is the method of any of aspects 32-41, wherein the UE drops the transmission of the SRS on the one or more additional SRS symbols if SRS flexible timing is configured for the UE and the uplink transmission on the source CC having a higher priority than the one or more additional SRS symbols.

Aspect 43 is the method of any of aspects 32-42, wherein the UE drops the transmission of the SRS on the one or more additional SRS symbols based on the uplink transmission on the source CC having a higher priority than the one or more additional SRS symbols.

Aspect 44 is a method of wireless communication at a UE, comprising: transmitting an indication of support for a carrier switching capability for transmitting an aperiodic SRS on one or more additional SRS symbols relative to a first set of SRS symbols associated with an aperiodic trigger Type 1 or a periodic trigger Type 0, the one or more additional SRS symbols being associated with SRS switching from a source CC to a destination CC and being on the destination CC; and receiving scheduling for communication with a base station, including the aperiodic SRS on the one or more additional SRS symbols based on the carrier switching capability.

Aspect 45 is the method of aspect 44, wherein the indication indicates whether the UE supports a general capability for the aperiodic SRS on the one or more additional SRS symbols with the carrier switching, the general capability being without reference to a band combination.

Aspect 46 is the method of any of aspects 44-45, wherein the indication indicates the UE does not support the aperiodic SRS on the one or more additional SRS symbols with the carrier switching in a license assisted access carrier.

Aspect 47 is an apparatus at a base station comprising at least one processor; and at least one memory communicatively coupled with the at least one processor and storing processor-readable code that, when executed by the at least one processor, is configured to cause the base station to perform the method of any of aspects 1-7.

Aspect 48 is the apparatus of aspects 47, further comprising a transceiver.

Aspect 49 is an apparatus at a UE comprising at least one processor; and at least one memory communicatively coupled with the at least one processor and storing processor-readable code that, when executed by the at least one processor, is configured to cause the UE to perform the method of any of aspects 8-14.

Aspect 50 is the apparatus of aspects 49, further comprising a transceiver.

Aspect 51 is an apparatus at a base station comprising at least one processor; and at least one memory communicatively coupled with the at least one processor and storing processor-readable code that, when executed by the at least one processor, is configured to cause the base station to perform the method of any of aspects 15-20.

Aspect 52 is the apparatus of aspects 51, further comprising a transceiver.

Aspect 53 is an apparatus at a base station comprising at least one processor; and at least one memory communicatively coupled with the at least one processor and storing processor-readable code that, when executed by the at least one processor, is configured to cause the base station to perform the method of any of aspects 21-31.

Aspect 54 is the apparatus of aspects 51, further comprising a transceiver.

Aspect 55 is an apparatus at a UE comprising at least one processor; and at least one memory communicatively coupled with the at least one processor and storing processor-readable code that, when executed by the at least one processor, is configured to cause the UE to perform the method of any of aspects 32-43.

Aspect 56 is the apparatus of aspects 55, further comprising a transceiver.

Aspect 57 is an apparatus at a UE comprising at least one processor; and at least one memory communicatively coupled with the at least one processor and storing processor-readable code that, when executed by the at least one processor, is configured to cause the UE to perform the method of any of aspects 44-46.

Aspect 58 is the apparatus of aspects 57, further comprising a transceiver.

Aspect 59 is an apparatus at a base station comprising means for performing the method of any of aspects 1-7.

Aspect 60 is the apparatus of aspects 59, further comprising a transceiver.

Aspect 61 is an apparatus at a UE comprising means for performing the method of any of aspects 8-14.

Aspect 62 is the apparatus of aspects 61, further comprising a transceiver.

Aspect 63 is an apparatus at a base station comprising means for performing the method of any of aspects 15-20.

Aspect 64 is the apparatus of aspects 63, further comprising a transceiver.

Aspect 65 is an apparatus at a base station comprising means for performing the method of any of aspects 21-31.

Aspect 66 is the apparatus of aspects 65, further comprising a transceiver.

Aspect 67 is an apparatus at a UE comprising means for performing the method of any of aspects 32-43.

Aspect 68 is the apparatus of aspects 67, further comprising a transceiver.

Aspect 69 is an apparatus at a UE comprising means for performing the method of any of aspects 44-46.

Aspect 70 is the apparatus of aspects 69, further comprising a transceiver.

Aspect 71 is a computer-readable medium storing computer executable code, where the code when executed by a processor causes the processor to perform the method of any of aspects 1-7.

Aspect 72 is a computer-readable medium storing computer executable code, where the code when executed by a processor causes the processor to perform the method of any of aspects 8-14.

Aspect 73 is a computer-readable medium storing computer executable code, where the code when executed by a processor causes the processor to perform the method of any of aspects 15-20.

Aspect 74 is a computer-readable medium storing computer executable code, where the code when executed by a processor causes the processor to perform the method of any of aspects 21-31.

Aspect 75 is a computer-readable medium storing computer executable code, where the code when executed by a processor causes the processor to perform the method of any of aspects 32-43.

Aspect 76 is a computer-readable medium storing computer executable code, where the code when executed by a processor causes the processor to perform the method of any of aspects 44-46.

What is claimed is:
1. A method of wireless communication at a user equipment (UE), comprising:
receiving a sounding reference signal (SRS) configuration and a downlink transmission scheduling an uplink transmission,
the uplink transmission being scheduled on a source component carrier (CC), the SRS configuration comprising one or more additional SRS symbols relative to a first set of SRS symbols associated with an aperiodic trigger Type 1 or a periodic trigger Type 0, the one or more additional SRS symbols being scheduled on a destination CC, at least one of the one or more additional SRS symbols overlapping at least partially with the uplink transmission, the one or more additional SRS symbols being scheduled on a first serving cell in a first subframe that overlaps with a second subframe on a second serving cell, the first subframe being subframe N and the second subframe being subframe N+1, and the first serving cell and the second serving cell being within a same serving cell set; and dropping, based on the one or more additional SRS symbols being scheduled on the first serving cell in the first subframe that overlaps with the second subframe on the second serving cell and the first subframe being the subframe N and the second subframe being the subframe N+1, a transmission of at least a part of an SRS in the one or more additional SRS symbols on the destination CC or at least a part of the uplink transmission on the source CC, wherein SRS flexible timing is configured for the first set of SRS symbols and not for the one or more additional SRS symbols.

2. The method of claim 1, wherein the dropping the transmission of at least the part of the SRS in the one or more additional SRS symbols on the destination CC or at least the part of the uplink transmission on the source CC is based on a priority rule.

3. The method of claim 2, wherein the UE drops the transmission of the SRS in the one or more additional SRS symbols on the destination CC based on the uplink transmission comprising at least one of:
hybrid automatic repeat request (HARQ) feedback,
a scheduling request (SR),
a rank indicator (RI),
a precoder type indicator (PTI),
a channel state information reference signal (CSI-RS) Resource Indicator (CRI), or
a random access channel (RACH).

4. The method of claim 2, wherein the UE drops the uplink transmission based on the uplink transmission comprising at least one of:
aperiodic channel state information (A-CSI),
channel state information other than hybrid automatic repeat request (HARQ) feedback, a SR, a RI, a PTI, or a CRI,
another SRS not on a CC including a physical uplink shared channel (PUSCH) or a physical uplink control channel (PUCCH), or
periodic SRS on a CC without the PUSCH or the PUCCH.

5. The method of claim 2, wherein the UE drops the transmission of the SRS in the one or more additional SRS symbols on the destination CC based on the uplink transmission comprising an aperiodic SRS not in the one or more additional SRS symbols, on another CC without a physical uplink shared channel (PUSCH) or a physical uplink control channel (PUCCH).

6. The method of claim 2, wherein the UE drops the uplink transmission based on the uplink transmission comprising an aperiodic SRS not in the one or more additional SRS symbols on a CC without a physical uplink shared channel (PUSCH) or a physical uplink control channel (PUCCH).

7. The method of claim 1, wherein the uplink transmission on the source CC has a higher priority than the one or more additional SRS symbols.

8. The method of claim 1, wherein the UE drops the transmission of the SRS in the one or more additional SRS symbols based on the SRS flexible timing being configured for the first set of SRS symbols and not for the one or more additional SRS symbols.

9. The method of claim 1, wherein the UE drops the transmission of the SRS in the one or more additional SRS symbols if the SRS flexible timing is configured for the UE and the uplink transmission on the source CC having a higher priority than the one or more additional SRS symbols.

10. The method of claim 1, wherein the UE drops the transmission of the SRS in the one or more additional SRS symbols based on the uplink transmission on the source CC having a higher priority than the one or more additional SRS symbols.

11. The method of claim 1, wherein the dropping of the transmission of the at least the part of the SRS in the one or more additional SRS symbols is based on the one or more additional SRS symbols being on the first serving cell in the first subframe that overlaps with the second subframe on the second serving cell.

12. The method of claim 1, wherein the UE drops the transmission of the SRS in the one or more additional SRS symbols, based on the uplink transmission on the source CC having a higher priority than the one or more additional SRS symbols.

13. An apparatus for wireless communication at a user equipment (UE), comprising:
at least one processor; and
at least one memory communicatively coupled with the at least one processor and storing processor-readable code that, when executed by the at least one processor, is configured to cause the UE to:
receive a sounding reference signal (SRS) configuration and a downlink transmission scheduling an uplink transmission,
the uplink transmission being scheduled on a source component carrier (CC),
the SRS configuration comprising one or more additional SRS symbols relative to a first set of SRS symbols associated with an aperiodic trigger Type 1 or a periodic trigger Type 0,
the one or more additional SRS symbols being scheduled on a destination CC,
at least one of the one or more additional SRS symbols overlapping at least partially with the uplink transmission,
the one or more additional SRS symbols being scheduled on a first serving cell in a first subframe that overlaps with a second subframe on a second serving cell, the first subframe being subframe N and the second subframe being subframe N+1, and
the first serving cell and the second serving cell being within a same serving cell set; and
drop, based on the one or more additional SRS symbols being scheduled on the first serving cell in the first subframe that overlaps with the second subframe on the second serving cell and the first subframe being the subframe N and the second subframe being the subframe N+1, a transmission of at least a part of an SRS in the one or more additional SRS symbols on the destination CC or at least a part of the uplink transmission on the source CC, wherein SRS flexible timing is configured for the first set of SRS symbols and not for the one or more additional SRS symbols.

14. The apparatus of claim 13, wherein the at least one processor is further configured to:
use a priority rule to determine whether to drop the transmission of at least the part of the SRS in the one or more additional SRS symbols on the destination CC or at least the part of the uplink transmission on the source CC.

15. The apparatus of claim 14, wherein the at least one processor is configured to drop the transmission of the SRS in the one or more additional SRS symbols on the destination CC based on the uplink transmission comprising at least one of:
hybrid automatic repeat request (HARQ) feedback,
a scheduling request (SR),
a rank indicator (RI),
a precoder type indicator (PTI),
a channel state information reference signal (CSI-RS) Resource Indicator (CRI), or
a random access channel (RACH).

16. The apparatus of claim 14, wherein the at least one processor is configured to drop the transmission of the uplink transmission based on the uplink transmission comprising at least one of:
aperiodic channel state information (A-CSI),
channel state information other than hybrid automatic repeat request (HARQ) feedback SR, RI, PTI, or CRI,
another SRS not on a CC including a physical uplink shared channel (PUSCH) or a physical uplink control channel (PUCCH), or
periodic SRS on a CC without the PUSCH or the PUCCH.

17. The apparatus of claim 14, wherein the at least one processor is configured to drop the transmission of the SRS in the one or more additional SRS symbols on the destination CC based on the uplink transmission comprising an aperiodic SRS not in the one or more additional SRS symbols on another CC without a physical uplink shared channel (PUSCH) or a physical uplink control channel (PUCCH).

18. The apparatus of claim 14, wherein the at least one processor is configured to drop the transmission of the uplink transmission based on the uplink transmission comprises an aperiodic SRS not in the one or more additional SRS symbols on a CC without a physical uplink shared channel (PUSCH) or a physical uplink control channel (PUCCH).

19. The apparatus of claim 13, wherein the at least one processor is configured to drop the transmission of the SRS on the one or more additional SRS symbols, wherein the uplink transmission on the source CC has a higher priority than the one or more additional SRS symbols.

20. The apparatus of claim 13, wherein the at least one processor is configured to drop the transmission of the SRS on the one or more additional SRS symbols, wherein the uplink transmission on the source CC has a higher priority than the one or more additional SRS symbols.

21. The apparatus of claim 13, wherein the UE is not a license assisted access (LAA) UE, band-limited/coverage-enhanced (BL/CE) UE, or a UE configured with multiple cell groups may not be configured with the one or more additional SRS symbols.

22. The apparatus of claim 13, wherein the at least one processor is configured to delay the transmission of the SRS on the one or more additional SRS symbols before the transmission is dropped, based on the SRS flexible timing being configured for the UE and the uplink transmission on the source CC having a higher priority than the one or more additional SRS symbols.

23. The apparatus of claim 13, wherein the UE does not comprise a assisted access (LAA) UE, a band-limited/coverage-enhanced (BL/CE) UE, or a configuration with multiple cell groups.

24. The apparatus of claim 13, wherein the at least one processor is configured to cause the UE to drop the transmission of the at least the part of the SRS in the one or more additional SRS symbols is based on the one or more additional SRS symbols being on the first serving cell in the first subframe that overlaps with the second subframe on the second serving cell.

25. An apparatus for wireless communication at a user equipment (UE), comprising:
means for receiving a sounding reference signal (SRS) configuration and a downlink transmission scheduling an uplink transmission,
the uplink transmission being scheduled on a source component carrier (CC),
the SRS configuration comprising one or more additional SRS symbols relative to a first set of SRS symbols associated with an aperiodic trigger Type 1 or a periodic trigger Type 0,
the one or more additional SRS symbols being scheduled on a destination CC,
at least one of the one or more additional SRS symbols overlapping at least partially with the uplink transmission,
the one or more additional SRS symbols being scheduled on a first serving cell in a first subframe that overlaps with a second subframe on a second serving cell, the first subframe being subframe N and the second subframe being the subframe N+1, and
the first serving cell and the second serving cell being within a same serving cell set; and
means for dropping, based on the one or more additional SRS symbols being scheduled on the first serving cell in the first subframe that overlaps with the second subframe on the second serving cell and the first subframe being subframe N and the second subframe being subframe N+1, a transmission of at least a part of an SRS in the one or more additional SRS symbols on the destination CC or at least a part of the uplink transmission on the source CC, wherein SRS flexible timing is configured for the first set of SRS symbols and not for the one or more additional SRS symbols.

26. The apparatus of claim 25, wherein the uplink transmission on the source CC has a higher priority than the one or more additional SRS symbols.

27. The apparatus of claim 25, further comprising:
means for using a priority rule to determine whether to drop the transmission of at least the part of the SRS in the one or more additional SRS symbols on the destination CC or at least the part of the uplink transmission on the source CC.

28. The apparatus of claim 25, wherein the means for dropping are configured to drop the transmission of the SRS in the one or more additional SRS symbols on the destination CC based on the uplink transmission comprising at least one of:
hybrid automatic repeat request (HARQ) feedback,
a scheduling request (SR),
a rank indicator (RI),
a precoder type indicator (PTI), a channel state information reference signal (CSI-RS) Resource Indicator (CRI), or a random access channel (RACH).

29. A non-transitory computer-readable medium storing computer executable code at a user equipment (UE), the code when executed by at least one processor causes the UE to:

receive a sounding reference signal (SRS) configuration and a downlink transmission scheduling an uplink transmission,
- the uplink transmission being scheduled on a source component carrier (CC),
- the SRS configuration comprising one or more additional SRS symbols relative to a first set of SRS symbols associated with an aperiodic trigger Type 1 or a periodic trigger Type 0,
- the one or more additional SRS symbols being scheduled on a destination CC,
- at least one of the one or more additional SRS symbols overlapping at least partially with the uplink transmission,
- the one or more additional SRS symbols being scheduled on a first serving cell in a first subframe that overlaps with a second subframe on a second serving cell, the first subframe being subframe N and the second subframe being subframe N+1, and
- the first serving cell and the second serving cell being within a same serving cell set; and drop, based on the one or more additional SRS symbols being scheduled on the first serving cell in the first subframe that overlaps with the second subframe on the second serving cell and the first subframe being the subframe N and the second subframe being the subframe N+1, a transmission of at least a part of an SRS in the one or more additional SRS symbols on the destination CC or at least a part of the uplink transmission on the source CC, wherein SRS flexible timing is configured for the first set of SRS symbols and not for the one or more additional SRS symbols.

30. The non-transitory computer-readable medium of claim 29, wherein the uplink transmission on the source CC has a higher priority than the one or more additional SRS symbols.

\* \* \* \* \*